(12) United States Patent
Dewit et al.

(10) Patent No.: US 10,359,011 B2
(45) Date of Patent: Jul. 23, 2019

(54) VERTICAL AIR INTAKE SYSTEM; AIR CLEANER; AND FILTER ELEMENT

(71) Applicant: Donaldson Company, Inc., Minneapolis, MN (US)

(72) Inventors: Johan Dewit, CP The Hague (NL); Johnny Craessaerts, Sint-Agatha-Rode (BE)

(73) Assignee: Donaldson Company, Inc., Minneapolis, MN (US)

( * ) Notice: Subject to any disclaimer, the term of this patent is extended or adjusted under 35 U.S.C. 154(b) by 531 days.

(21) Appl. No.: 14/892,812

(22) PCT Filed: May 22, 2014

(86) PCT No.: PCT/US2014/039237
§ 371 (c)(1),
(2) Date: Nov. 20, 2015

(87) PCT Pub. No.: WO2014/190206
PCT Pub. Date: Nov. 27, 2014

(65) Prior Publication Data
US 2016/0108866 A1    Apr. 21, 2016

Related U.S. Application Data

(60) Provisional application No. 61/916,699, filed on Dec. 16, 2013, provisional application No. 61/826,870, (Continued)

(51) Int. Cl.
*B01D 46/00* (2006.01)
*B01D 46/52* (2006.01)
(Continued)

(52) U.S. Cl.
CPC ... *F02M 35/02433* (2013.01); *B01D 46/0002* (2013.01); *B01D 46/0023* (2013.01);
(Continued)

(58) Field of Classification Search
None
See application file for complete search history.

(56) References Cited

U.S. PATENT DOCUMENTS 4,242,115 A    12/1980   Harold et al.
4,410,427 A    10/1983   Wydeven
(Continued)

FOREIGN PATENT DOCUMENTS

DE    202008017059 U1    5/2010
EP         0164956 A1    12/1985
(Continued)

OTHER PUBLICATIONS

International Search Report for PCT/US2014/039237, dated Oct. 6, 2014.
International Search Report for PCT/US2014/039237, Oct. 6, 2014.

*Primary Examiner* — Duane Smith
*Assistant Examiner* — Brit E. Anbacht
(74) *Attorney, Agent, or Firm* — Merchant & Gould P.C.

(57) ABSTRACT

An air filter element includes a filter arrangement, an elbow, and a filter element seal member. The filter arrangement includes a filter media pack having a dirty air inlet and a clean air outlet, wherein air flowing through the clean air outlet flows in a first axial direction and the clean air outlet defines a filter arrangement cross sectional area. The elbow has a first end constructed to extend from the filter arrangement clean air outlet, a second end wherein air flowing through the second end flows in a second axial direction, and an air flow enclosure extending from the elbow first end to the elbow second end. The air flow enclosure includes an air deflector constructed to direct air from the first axial direction to the second axial direction, wherein the second axial direction is different from the first axial direction, and an interior volume between the elbow first end and the elbow second end. The filter element seal member is located on the (Continued)

elbow second end, wherein the filter element seal member is constructed to seal to a clean air intake, the filter element seal member located on the elbow second end defining a seal member cross sectional area. The filter element can be characterized as having a ratio of the seal member cross sectional area to the filter arrangement cross sectional area of at least 0.5. The filter element can have a z-filter media pack for a pleated media pack. The air filter element can be arranged in an air cleaner.

27 Claims, 34 Drawing Sheets

Related U.S. Application Data filed on May 23, 2013, provisional application No. 61/826,459, filed on May 22, 2013.

(51) Int. Cl.
  *B01D 50/00* (2006.01)
  *F02M 35/02* (2006.01)
  *F02M 35/024* (2006.01)

(52) U.S. Cl.
  CPC ..... *B01D 46/0047* (2013.01); *B01D 46/0049* (2013.01); *B01D 46/521* (2013.01); *B01D 46/527* (2013.01); *B01D 50/002* (2013.01); *F02M 35/0216* (2013.01); *F02M 35/0245* (2013.01); *F02M 35/02483* (2013.01)

(56) References Cited

U.S. PATENT DOCUMENTS

| | | | |
|---|---|---|---|
| 4,418,662 A * | 12/1983 | Engler | B01D 46/0036 123/198 D |
| 4,476,021 A * | 10/1984 | Souza | B01D 35/02 210/248 |
| 4,589,983 A | 5/1986 | Wydevan | |
| 4,746,340 A | 5/1988 | Durre et al. | |
| D326,706 S | 6/1992 | Karlsson | |
| 5,222,488 A | 6/1993 | Forsgren | |
| 5,613,992 A | 3/1997 | Engel | |
| 5,772,883 A | 6/1998 | Rothman et al. | |
| D396,098 S | 7/1998 | Gillingham et al. | |
| 5,792,247 A | 8/1998 | Gillingham et al. | |
| D398,046 S | 9/1998 | Gillingham et al. | |
| 5,800,581 A * | 9/1998 | Gielink | B01D 46/0002 55/385.3 |
| D399,944 S | 10/1998 | Gillingham et al. | |
| 5,820,646 A | 10/1998 | Gillingham et al. | |
| 5,895,574 A | 4/1999 | Friedmann et al. | |
| 5,902,364 A | 5/1999 | Tokar et al. | |
| D417,268 S | 11/1999 | Gillingham et al. | |
| 6,039,778 A | 3/2000 | Coulonvaux | |
| D428,128 S | 7/2000 | Gillingham et al. | |
| 6,179,890 B1 | 1/2001 | Ramos et al. | |
| D437,401 S | 2/2001 | Ramos et al. | |
| D437,402 S | 2/2001 | Gieseke et al. | |
| 6,190,432 B1 | 2/2001 | Gieseke et al. | |
| 6,210,469 B1 * | 4/2001 | Tokar | A47L 9/102 55/319 |
| 6,221,122 B1 | 4/2001 | Gieseke et al. | |
| 6,235,195 B1 | 5/2001 | Tokar | |
| D444,219 S | 6/2001 | Gieseke et al. | |
| D447,549 S | 9/2001 | Gieseke et al. | |
| 6,293,984 B1 | 9/2001 | Oda et al. | |
| D450,827 S | 11/2001 | Gieseke et al. | |
| D450,828 S | 11/2001 | Tokar | |
| 6,348,084 B1 | 2/2002 | Gieseke et al. | |
| 6,348,085 B1 | 2/2002 | Tokar et al. | |
| 6,350,291 B1 | 2/2002 | Gieseke et al. | |
| 6,350,296 B1 | 2/2002 | Warner | |
| 6,368,374 B1 | 4/2002 | Tokar et al. | |
| D460,169 S | 7/2002 | Anderson et al. | |
| D461,003 S | 7/2002 | Gieseke et al. | |
| 6,416,605 B1 | 7/2002 | Golden | |
| D464,129 S | 10/2002 | Xu et al. | |
| 6,517,598 B2 | 2/2003 | Anderson et al. | |
| D471,623 S | 3/2003 | Gieseke et al. | |
| D473,637 S | 4/2003 | Golden | |
| 6,572,667 B1 | 6/2003 | Greif et al. | |
| D477,659 S | 7/2003 | Gieseke et al. | |
| 6,610,126 B2 | 8/2003 | Xu et al. | |
| D481,101 S | 10/2003 | Gieseke et al. | |
| 6,652,614 B2 | 11/2003 | Gieseke et al. | |
| D483,459 S | 12/2003 | Dewit et al. | |
| D484,584 S | 12/2003 | Anderson et al. | |
| 6,673,136 B2 | 1/2004 | Gillingham et al. | |
| 6,736,874 B2 | 5/2004 | Rieger et al. | |
| 6,743,317 B2 | 6/2004 | Wydeven | |
| D497,202 S | 10/2004 | Stavos et al. | |
| 6,852,141 B2 | 2/2005 | Bishop et al. | |
| D506,539 S | 6/2005 | Bishop et al. | |
| 6,966,940 B2 | 11/2005 | Krisko et al. | |
| 7,004,986 B2 | 2/2006 | Kopec et al. | |
| 7,008,467 B2 * | 3/2006 | Krisko | B01D 45/12 95/268 |
| D520,619 S | 5/2006 | Kuempel et al. | |
| 7,070,642 B2 | 7/2006 | Scott et al. | |
| 7,094,269 B2 | 8/2006 | Yang | |
| 7,186,282 B2 | 3/2007 | Su | |
| 7,282,075 B2 | 10/2007 | Spone et al. | |
| 7,329,326 B2 | 2/2008 | Wagner et al. | |
| 7,351,270 B2 | 4/2008 | Engelland et al. | |
| 7,364,601 B2 | 4/2008 | Xu et al. | |
| 7,396,375 B2 | 7/2008 | Kuempel et al. | |
| 7,396,376 B2 | 7/2008 | Schrage et al. | |
| 7,488,365 B2 | 2/2009 | Golden et al. | |
| 7,501,004 B2 | 3/2009 | Tschech et al. | |
| 7,524,349 B2 | 4/2009 | Schrage et al. | |
| 7,537,631 B2 | 5/2009 | Scott et al. | |
| 7,569,090 B2 | 8/2009 | Nelson | |
| D600,790 S | 9/2009 | Nelson et al. | |
| 7,625,419 B2 | 12/2009 | Nelson et al. | |
| 7,655,074 B2 | 2/2010 | Nepsund et al. | |
| 7,670,402 B2 | 3/2010 | Miller | |
| 7,674,308 B2 | 3/2010 | Krisko et al. | |
| 7,682,416 B2 | 3/2010 | Engelland et al. | |
| 7,708,796 B2 | 5/2010 | Rieger et al. | |
| 7,713,321 B2 | 5/2010 | Kuempel et al. | |
| 7,753,982 B2 | 7/2010 | Merritt | |
| D635,233 S | 3/2011 | Nelson | |
| 7,905,936 B2 | 3/2011 | Olson et al. | |
| 7,967,886 B2 | 6/2011 | Schrage et al. | |
| 7,972,404 B2 | 7/2011 | Kuempel et al. | |
| 7,997,425 B2 | 8/2011 | Golden et al. | |
| 8,016,903 B2 | 9/2011 | Nelson et al. | |
| 8,034,145 B2 | 10/2011 | Boehrs et al. | |
| 8,038,756 B2 | 10/2011 | Iddings et al. | |
| 8,048,187 B2 | 11/2011 | Merritt et al. | |
| 8,048,188 B2 | 11/2011 | Engelland et al. | |
| 8,066,791 B2 | 11/2011 | Baseotto et al. | |
| 8,163,057 B2 | 4/2012 | Blossey et al. | |
| 8,177,872 B2 | 5/2012 | Nelson et al. | |
| 8,182,570 B2 | 5/2012 | Rieger | |
| 8,216,334 B2 | 7/2012 | Nelson et al. | |
| 8,226,786 B2 | 7/2012 | Schrage et al. | |
| 8,277,532 B2 | 10/2012 | Reichter et al. | |
| 8,357,219 B2 | 1/2013 | Boehrs et al. | |
| 8,475,556 B2 | 7/2013 | Kori et al. | |
| 8,506,668 B2 | 8/2013 | Swanson et al. | |
| 8,663,355 B2 | 3/2014 | Nelson et al. | |
| 8,758,470 B2 | 6/2014 | Blossey et al. | |
| 8,864,866 B2 | 10/2014 | Osendorf et al. | |
| 8,888,882 B2 * | 11/2014 | Ackermann | B01D 46/0021 55/385.3 |
| 9,192,885 B2 | 11/2015 | Blossey et al. | |
| 9,289,710 B2 | 3/2016 | Hasenfratz et al. | |
| 9,289,712 B2 | 3/2016 | Nelson et al. | |
| 9,500,164 B2 | 11/2016 | Ryon et al. | |
| 9,586,167 B2 | 3/2017 | Schmid et al. | |

(56) References Cited

U.S. PATENT DOCUMENTS

| | | |
|---|---|---|
| 2002/0096247 A1 | 7/2002 | Wydeven et al. |
| 2004/0187689 A1 | 9/2004 | Sporre et al. |
| 2005/0130508 A1 | 6/2005 | Yeh |
| 2006/0174598 A1 | 8/2006 | Mills et al. |
| 2006/0288676 A1 | 12/2006 | Geyer, III |
| 2007/0039296 A1 | 2/2007 | Schrage et al. |
| 2007/0235384 A1 | 10/2007 | Oku et al. |
| 2008/0168903 A1* | 7/2008 | Lane ................ B01D 46/0045 96/152 |
| 2008/0190082 A1 | 8/2008 | Scott et al. |
| 2008/0282890 A1 | 11/2008 | Rocklitz et al. |
| 2008/0307759 A1 | 12/2008 | Reichter et al. |
| 2009/0049814 A1 | 2/2009 | Baweotto et al. |
| 2009/0064646 A1 | 3/2009 | Reichter et al. |
| 2009/0094951 A1 | 4/2009 | Baseotto et al. |
| 2009/0100813 A1* | 4/2009 | Iddings ............... B01D 46/009 55/489 |
| 2009/0127211 A1 | 5/2009 | Rocklitz et al. |
| 2009/0151311 A1 | 6/2009 | Reichter et al. |
| 2009/0211450 A1 | 8/2009 | Mosset et al. |
| 2009/0217632 A1 | 9/2009 | Coulonvaux et al. |
| 2009/0301045 A1 | 12/2009 | Nelson et al. |
| 2010/0032365 A1 | 2/2010 | Moe et al. |
| 2010/0043366 A1 | 2/2010 | Boehrs et al. |
| 2010/0044295 A1 | 2/2010 | Campbell |
| 2010/0146917 A1 | 6/2010 | Coulonvaux et al. |
| 2010/0146919 A1 | 6/2010 | Nelson |
| 2010/0146920 A1 | 6/2010 | Iddings et al. |
| 2010/0293906 A1* | 11/2010 | Flagstad ............. B01D 46/527 55/326 |
| 2011/0173937 A1 | 7/2011 | Nelson |
| 2011/0232244 A1 | 9/2011 | Schrage et al. |
| 2012/0031060 A1 | 2/2012 | Iddings et al. |
| 2012/0067017 A1 | 3/2012 | Baseotto et al. |
| 2014/0039237 A1 | 2/2014 | Li |
| 2015/0013542 A1 | 1/2015 | Jasemfratz et al. |
| 2016/0061159 A1 | 3/2016 | Ryon et al. |
| 2016/0177891 A1 | 6/2016 | Yadav et al. |

FOREIGN PATENT DOCUMENTS

| | | |
|---|---|---|
| EP | 1286750 B1 | 4/2007 |
| EP | 1862209 B1 | 9/2010 |
| EP | 1216743 B1 | 3/2011 |
| EP | 2024631 B1 | 3/2011 |
| EP | 1852637 B1 | 7/2012 |
| EP | 2355916 B1 | 8/2013 |
| EP | 2175960 B1 | 1/2014 |
| EP | 2620203 B1 | 6/2014 |
| EP | 2029257 B1 | 11/2014 |
| GB | 2222964 A | 3/1990 |
| JP | 2001-524870 A | 12/2001 |
| JP | 2003-534497 A | 11/2003 |
| JP | 2008-513193 A | 5/2008 |
| JP | 2009-526648 A | 7/2009 |
| JP | 4514235 B2 | 7/2010 |
| JP | 4621406 B2 | 1/2011 |
| JP | 4956557 B2 | 6/2012 |
| JP | 2012-521882 A | 9/2012 |
| JP | 5690054 B2 | 3/2015 |
| KR | 102005003319 A | 3/2005 |
| KR | 100559420 B1 | 3/2006 |
| RU | 2132283 | 6/1999 |
| RU | 2417819 | 5/2011 |
| WO | WO 2004/007054 A1 | 1/2004 |
| WO | WO 2004/082795 A2 | 9/2004 |
| WO | WO 2005/063361 A1 | 7/2005 |
| WO | WO 2005/077487 A1 | 8/2005 |
| WO | WO 2007/022171 | 2/2007 |
| WO | WO 2007/044677 A1 | 4/2007 |
| WO | WO 2009/014982 A1 | 1/2009 |
| WO | WO 2009/014986 A1 | 1/2009 |
| WO | WO 2009/014988 A1 | 1/2009 |
| WO | WO 2009/064894 A1 | 5/2009 |
| WO | WO 2014/190206 A1 | 5/2009 |
| WO | WO 2012/116314 | 8/2012 |
| WO | WO 2013/050271 A1 | 4/2013 |

\* cited by examiner

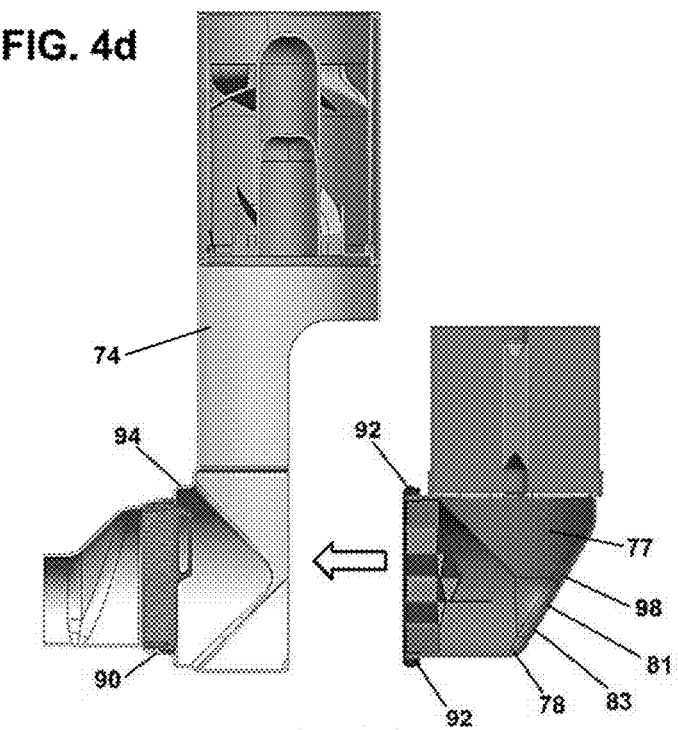
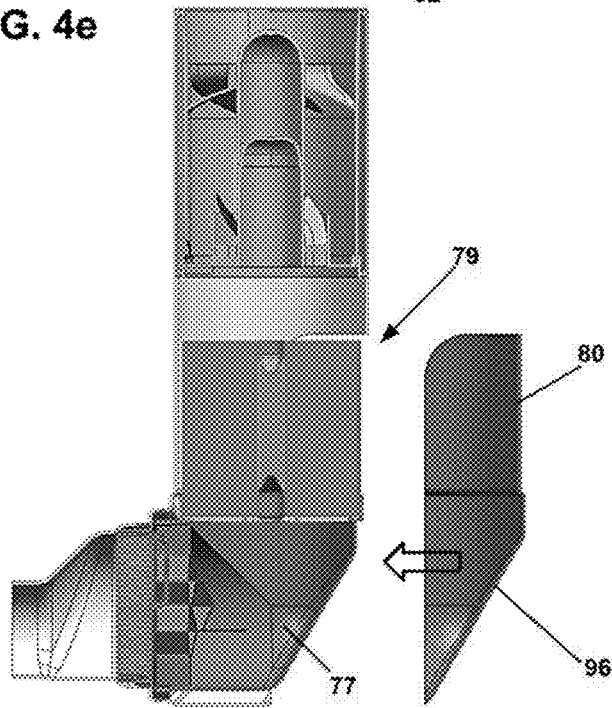

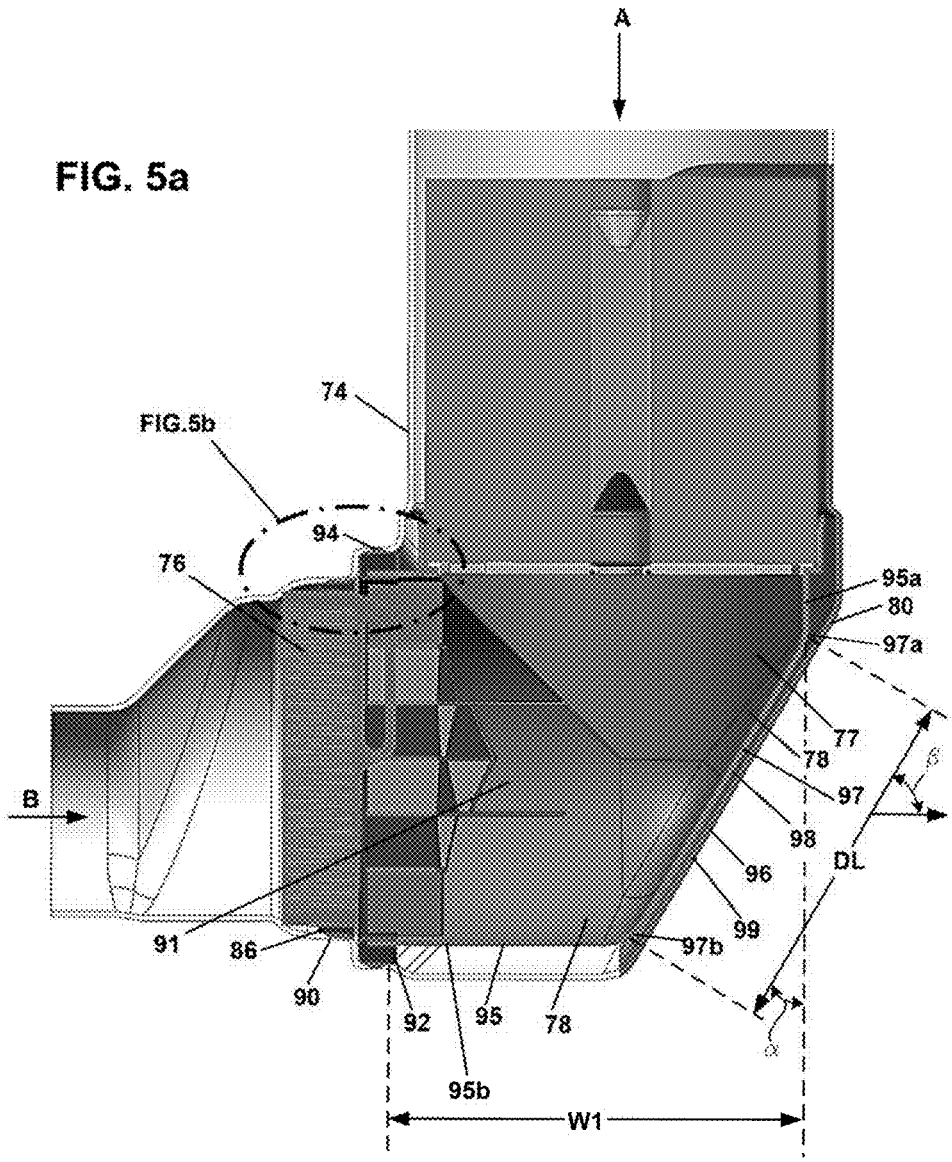

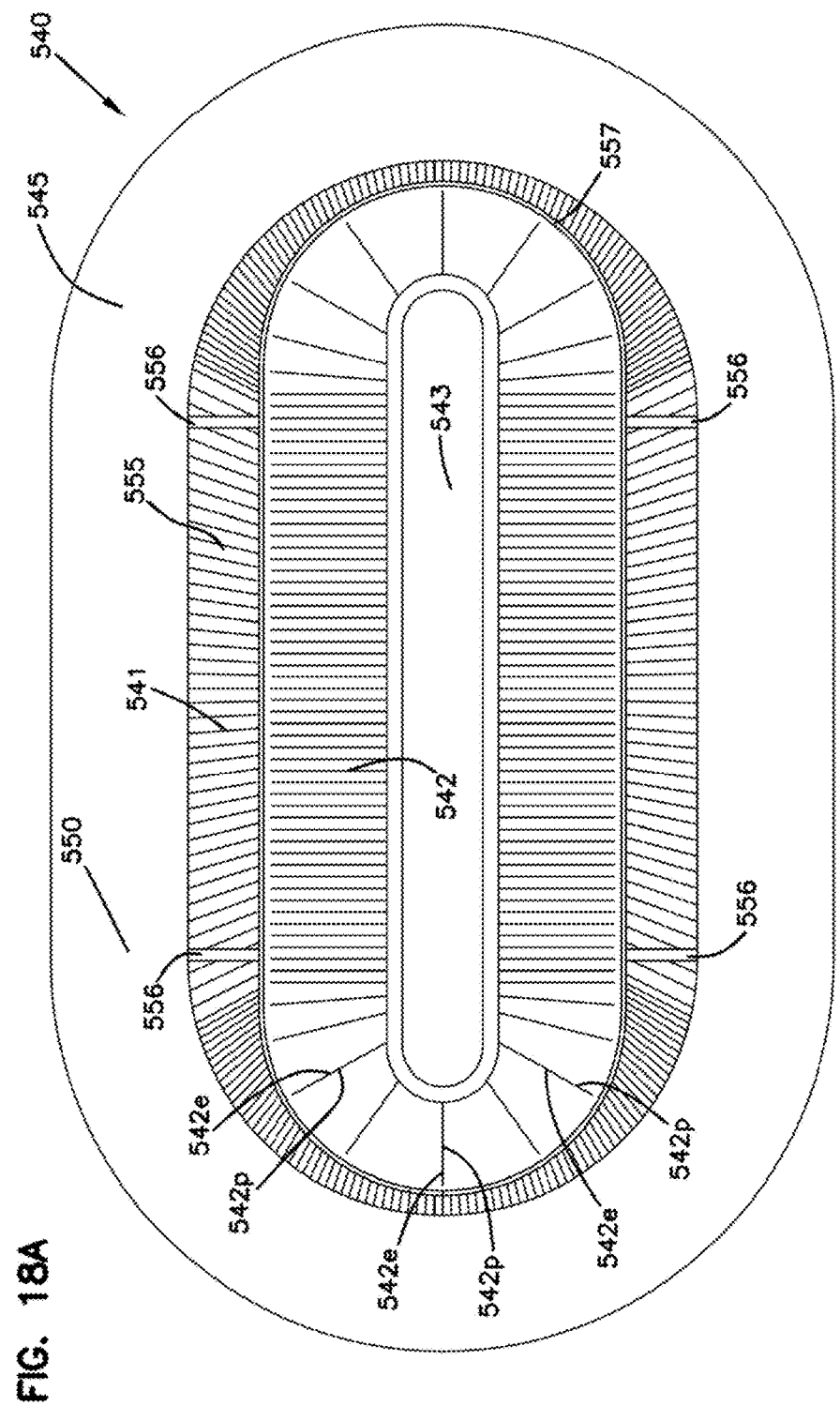

VERTICAL AIR INTAKE SYSTEM; AIR CLEANER; AND FILTER ELEMENT

CROSS-REFERENCE TO RELATED APPLICATIONS

This application is being filed on Nov. 20, 2015, as a US National Stage application of PCT International patent application No. PCT/US2014/039237, filed May 22, 2014, and claims priority to U.S. Provisional Application Ser. No. 61/826,459 filed with the United States Patent and Trademark Office (USPTO) on May 22, 2013, U.S. Provisional Application Ser. No. 61/826,870 filed with the USPTO on May 23, 2013, and U.S. Provisional Application Ser. No. 61/916,699 filed with the USPTO on Dec. 16, 2013 which applications are incorporated herein by reference. To the extent appropriate, a claim of priority is made to each of the above disclosed applications.

FIELD OF THE INVENTION

The present invention relates to an air cleaner for use with a vertical air intake system, removal and replaceable, i.e., serviceable, filter elements or cartridge components, and an air intake system for a motor vehicle. Although other applications are possible, the invention described is particularly useful in air cleaners for use in filtering air intake for engines (used for example in vehicles, construction, agriculture, mining, and generator systems). The invention also concerns methods of assembly and use.

BACKGROUND

Air streams carry contaminant material therein. In many instances, it is desired to filter some or all of the contaminant material from the air stream. For example, air flow streams to engines for motorized vehicles or for power generation equipment, construction equipment or other equipment, gas streams to gas turbine systems and air streams to various combustion furnaces, carry particulate contaminant therein. It is preferred for such system that the contaminant material be removed from (or have its level reduced in) the air or gas. A variety of air filter arrangements have been developed for contaminant reduction. In general, however, continued improvements are sought.

In certain type of systems, the air intake is arranged generally vertically and requires cleaning prior to using the air. When servicing an air cleaner provided in a vertically arranged air intake system, there is a potential that debris or particulates may fall therein. For example, there is potential that debris or particulates may fall from a primary filter element when replacing the primary filter element, and there is potential that debris or particulates may fall into the vertically arranged air intake system from another source. Accordingly, there is a desire to provide a vertically arranged air intake system that reduces the risk that debris or particulates will damage downstream equipment.

BRIEF DESCRIPTION OF THE DRAWINGS

FIG. 3c is a schematic view of an exemplary precleaner arrangement of FIG. 3a.

FIGS. 4a-f show servicing of the primary filtration and air diverter of FIG. 3b.

FIGS. 5a and 5b are sectional views of the primary filtration and air diverter of FIG. 4f.

FIG. 6 is an exploded view of the filter element of FIG. 5a.

FIG. 12b is a sectional view taken along line A-A of FIG. 12a.

FIG. 18a is a schematic flow end view of a filter media pack using an alternate media and useable according to the present disclosure.

FIG. 18b is a schematic opposite flow end view to the view of FIG. 18a.

FIG. 22c is a section view of the filter element of FIG. 22a.

DETAILED DESCRIPTION

Vertical Air Intake System

Figure 1:
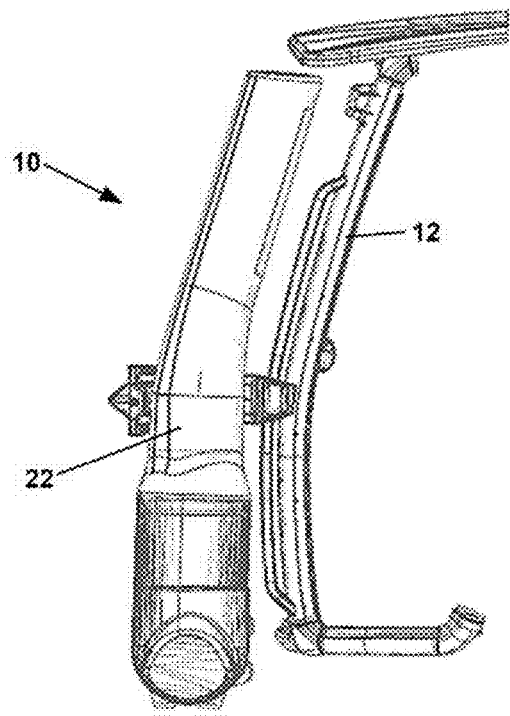
FIG. 1 is a side view of a vertical air intake system mounted on a vehicle according to the principles of the present disclosure.
Figure 2:
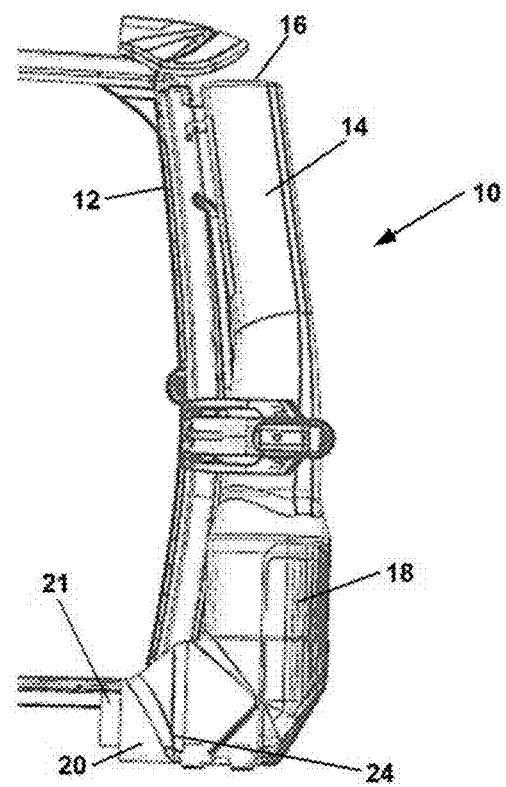
FIG. 2 is a front view of the vertical air intake system mounted on a vehicle as shown in FIG. 1.

In FIGS. 1 and 2, a vertical air intake system is shown at reference number 10 attached to a motor vehicle 12. The motor vehicle 12 is depicted as a part of a motor vehicle. The motor vehicle can be any type of a motor vehicle constructed to utilize the vehicle air intake system 10. Exemplary vehicles include tractors and trucks. The trucks can be off road trucks and over the highway trucks. The vertical air intake system 10 is designed for use on a motor vehicle where the air cleaner for the combustion engine is located near or outside of the engine compartment. That is, the air cleaner is not under the hood of the motor vehicle. In such motor vehicles, it is often desirable for the air intake to be located above the cab of the motor vehicle. Alternatively, at least part of the air cleaner can be located inside the engine compartment. The air intake system 10 can be referred to as a vertical air intake system (VAIS) because it draws air in from a location typically near or above the cab and in a vertically downward direction toward an air cleaner. In the disclosed vertical air intake system 10, the intake air is drawn downwardly and then turns about 90 degrees in order to enter the air intake for the motor vehicle.

The vertical air intake system 10 includes a snorkel 14 having an air inlet 16, and a primary filtration and air diverter region 18 having an air outlet 20. In general, air entering the air inlet 16 is dirty air in need of filtration, and air exiting the outlet 20 is filtered air. The air outlet 20 can extend to a duct 21 that enters the vehicle engine compartment wherein the engine is enclosed by a hood or bonnet. The primary filtration and air diverter region 18 can be referred to as the primary filtration and air diverter or more simply as the air cleaner. The air exiting the outlet 20 can be used as intake air for a motor vehicle combustion system. The vertical air intake system 10 can additionally include a precleaner region 22 and a secondary filtration region 24. In general, the precleaner region 22 can be provided within the snorkel 14 or the primary filtration and air diverter region 18. In general, the precleaner region 22 should be located upstream of the primary filter provided within the primary filtration and air diverter region 18. The precleaner region 22 can include a precleaner although it should be understood that the presence of a precleaner is optional. The secondary filtration region 24 can be provided in the primary filtration and air diverter region 18 or in the air outlet 20. Preferably, the secondary filtration region is provided downstream of the primary filter provided within the primary filtration and air diverter region 18. The secondary filtration region 24 can include a safety filter element but it should be understood that the presence of a safety filter element is optional.

Figure 3A:
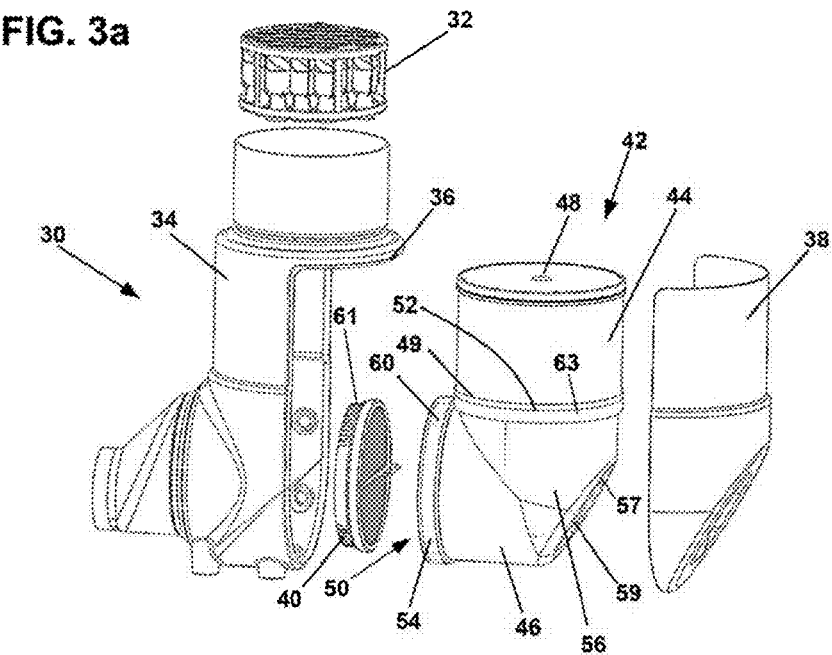
FIGS. 3a and 3b are exploded views of alternative embodiments of a primary filtration and air diverter for use as part of the vertical air intake system shown in FIGS. 1 and 2.
Figure 3B:
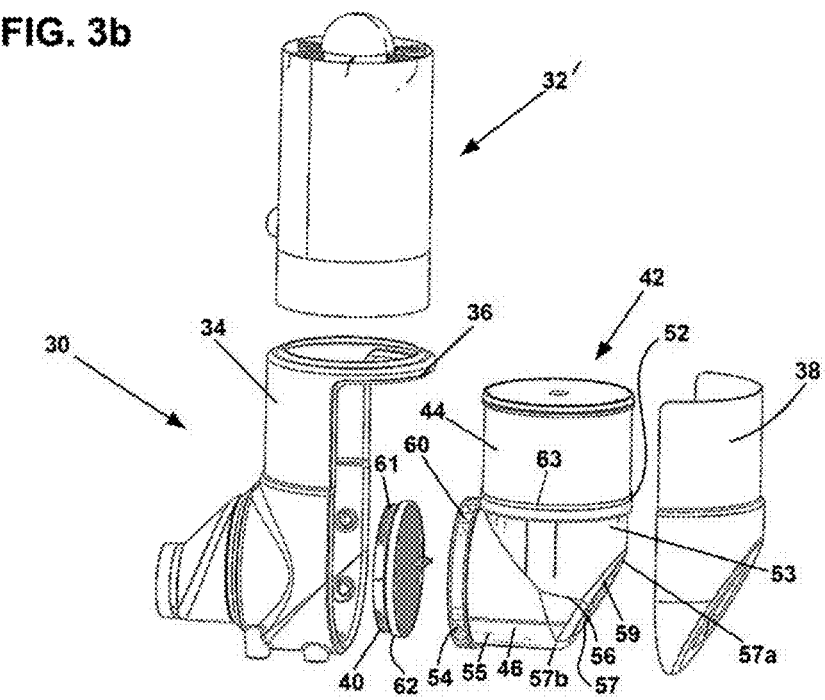
Figure 3C:
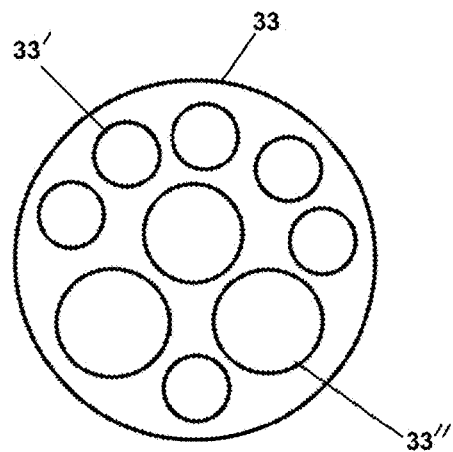

FIGS. 3a and 3b illustrate a primary filtration and air diverter region 30 combined with a precleaner 32 and 32', respectively, that can be used in the VAIS 10. The precleaner 32 or 32' includes one or more inertial separator. In general, an inertial separator uses inertial forces to separate liquid (if present) and particulates from the environmental air. Suitable inertial separators are available from Donaldson Company, Inc. under the name Strata™ Tube. Exemplary inertial separators that can be used include those described in, for example, U.S. Pat. Nos. 8,177,872, 4,242,115, 4,746,340, and 7,008,467, the entire disclosures of which are incorporated herein by reference. It is pointed out that the inertial separators depicted at reference number 32 are shown as Strata™ Tube inertial separators. The precleaner 32' is depicted as an alternative inertial separator and can be referred to as a vane precleaner. Referring to FIG. 3c, an exemplary precleaner arrangement 33 representative of an exemplary precleaner 32 is shown having different size or diameter inertial separators 33' and 33". As shown, there are multiple inertial separators 33' and 33" having different diameters. Providing different diameter inertial separators in a single precleaner can help manage space available for precleaning and flow therethrough.

The vertical air intake system 10 is constructed so that the air intake for a motor vehicle is not directly below the precleaner or the primary filter element. There is a tendency, when servicing a vehicle, for dust from a precleaner or a primary filter element to fall downwardly. The primary filtration and air diverter region 18 provides that the air intake for a combustion engine is less vulnerable for dust or debris falling therein when servicing the motor vehicle. For the VAIS 10, the flow of air is in a downwardly direction and then, after it has been filtered with a primary filter element, it is turned about 90 degrees so that the air is then available to be received in an air intake (duct 21) for a combustion engine. The VAIS 10, and the primary filtration and air diverter region 18, can be located outside the engine compartment which means that it is exterior to the hood enclosing the engine compartment. It is the clean air that passes into the engine compartment via the duct 21 shown in FIGS. 1 and 2, and the parts of the air clean that provide cleaning are not located directly above the air intake for the combustion engine. Although FIGS. 1 and 2 show the primary filtration and air diverter region 18 located outside of the engine compartment, it should be understood that the primary filtration and air diverted 18 can be provided at least partly within the engine compartment. Furthermore, even when at least part of the primary filtration and air diverter region is located within the engine compartment, the primary filter element can still be located outside of the engine compartment, if desired.

In both FIGS. 3a and 3b, the primary filtration and air diverter region 30 includes an air cleaner housing 34 having an access opening 36, an access cover 38 for attaching to the access opening 36, a safety element 40, and a primary filter element 42. The primary filter element 42 includes a media pack construction (or media pack) 44 and an elbow 46. The media pack 44 shown is depicted as a coiled z-media filter media pack having an inlet end 48 and an outlet end 49.

The elbow 46 has a first end 52, a second end 54, and an air diverter region 56. The first end 52 of the elbow 46 is constructed to attach to the second end 49 of the media pack 44. In the embodiment shown, the first end 52 of the elbow 46 is adhesively attached to the second end 49 of the media pack 44. As discussed in more detail below, a releasable seal member can be provided for attaching the second end 49 of the media pack 44 to the first end 52 of the elbow 46. The second end 54 of the elbow 46 is constructed to seal to the air cleaner housing 34. In the embodiment shown, the second end 54 of the elbow 46 includes a seal member 60 that is provided as a radial seal. A radial seal is a seal that is subject to primarily forces in a radial direction to create a seal. The flow of air at the particular location is generally consistent with the axial direction at that location. The radial direction is generally 90 degrees relative to the axial direction. Another way of characterizing a radial seal is that the compressive forces in the seal member are generally in a radial direction (perpendicular) relative to a central axis about which the seal member is provided. In contrast, an axial seal results when the compressive forces within the seal member are generally aligned with the central axis about which the seal member is provided. Another difference between a radial seal and an axial seal is that a radial seal has a tendency to remain in place once the seal is created thereby maintaining the seal unless moved and without a need to apply a continuous compressive force against the seal member in an axial direction. Often a structure is provided that keeps a filter element subject to a radially directed seal member from backing out of engagement with a radial seal surface on a housing. Such a structure that merely keeps the filter element from backing out is not considered a continuous compressive force in an axial direction. In contrast, an axial seal generally requires a continuous compressive force in an axial direction to pinch the axial seal and to maintain the seal. In the case of an axial seal, once the compressive forces are removed, there is no longer a seal and fluid is typically able to bypass the seal member.

The air diverter region 56 is constructed to divert the air from flowing in a first axial direction to flow in a second axial direction. The air diverter region 56 includes a first wall 53 and a second wall 55. The first wall 53 extends from the first end 52, and the second wall 55 extends from the second end 54. The air diverter region 56 includes an air deflector or scoop 57 that deflects the air and causes it to change directions. The air deflector 57 extends from the first wall 53 to the second wall 55. The air deflector 57 extends from an air deflector first end 57a to an air deflector second end 57b. The air deflector first end 57a joins the first wall at a discontinuity, and the air deflector second end 57b joins the second wall 55 at a discontinuity. In general, the "discontinuity" refers to a change in angle. Furthermore, the discontinuity need not be at a precise location, but can be gradual. The air deflector or scoop 57 can be provided as a ramp 59. Air flowing through the media pack 44 can be considered as air flowing in a first axial direction because the air flows generally from the first end 48 to the second end 49. The air diverter region 56 causes the air to divert from the first axial direction to a second axial direction different from the first axial direction. In the embodiment shown in FIGS. 3a and 3b, the mass air flow is directed to turn about 90 degrees. It should be appreciated that the turn can be, for example, about 30 degrees to about 160 degrees. Other exemplary ranges for turning the air include, for example, about 45 degrees to about 135 degrees, about 70 degrees to about 120 degrees, about 75 degrees to about 115 degrees, and 80 degrees to about 100 degrees. The direction in which the air flows after being turned by the air deflector or scoop 57 can be referred to as the second axial direction.

The safety element 40 is depicted as a pleated filter element having a frame 61 and radial seal 62 on the frame 61 for engaging the housing 34. Another way of considering the change in air flow direction is considering the relative directions of the first end 52 of the elbow 46 and the second end 54 of the elbow 46. In general, the first end 52 can be provided in a first plane and the second end 54 can be provided in a second plane. The first plane can be considered the plane where the first end 52 engages the outlet end 49 of the media pack 44, and the second plane is where the second end 54 engages the housing 34. The angle of the first plane relative to the second plane can be about 30 degrees to about 160 degrees. In addition, the angle can be about 60 degrees to about 120 degrees. Other exemplary ranges for the angle between the first plane and the second plane include, for example, about 45 degrees to about 135 degrees, about 70 degrees to about 120 degrees, about 75 degrees to about 115 degrees, and 80 degrees to about 100 degrees.

The elbow 46 can also be referred to as a shell having a first end 52 that includes a lip 63 extending along at least a portion of the outside of the media pack 44 at the second end or outlet end 49. The first end 52 is shown engaging an outside of the media pack 44 and extending along the outside of the media pack at least a part of the distance between the outlet end 49 and the inlet end 48. The elbow or shell 46 additionally includes an outlet end or second end 54. The elbow or shell 46 additionally includes the open area 50 therein through which the filtered air flows.

The media pack 44 is exemplified as a coiled z-media filter pack. In general, a z-filter media pack can also be referred as a z-filter construction. As used herein, the terms z-media filter pack or z-media filter construction are meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and Des. 437,401; each of these references being incorporated herein by reference. Greater detail regarding the z-media filter pack is provided below.

Figure 4A:
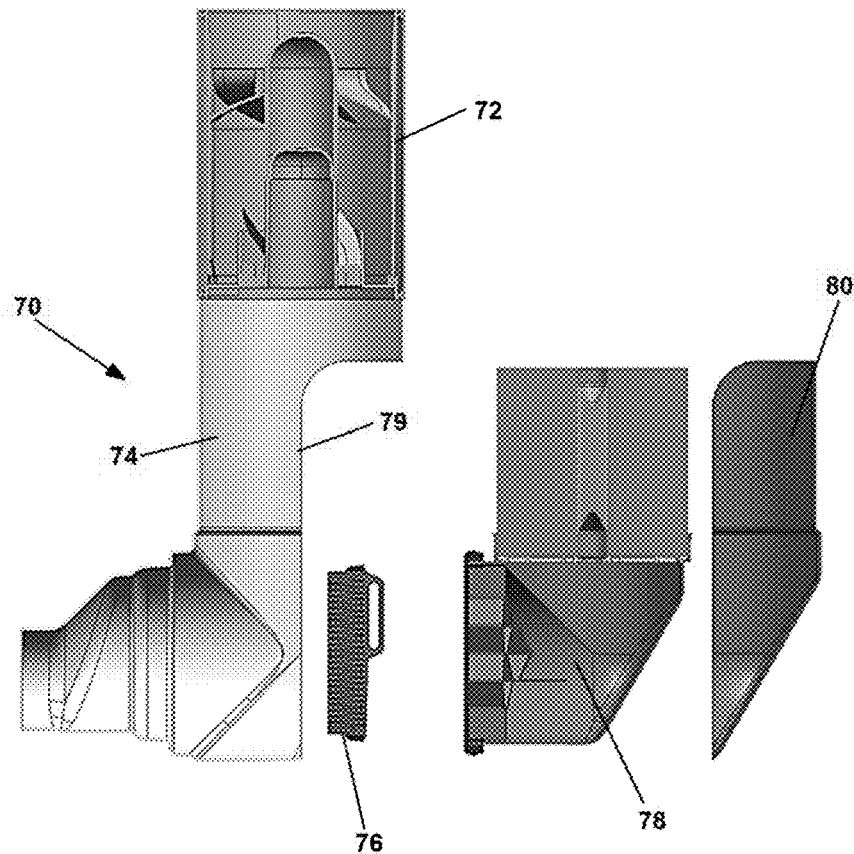
Figure 4B:
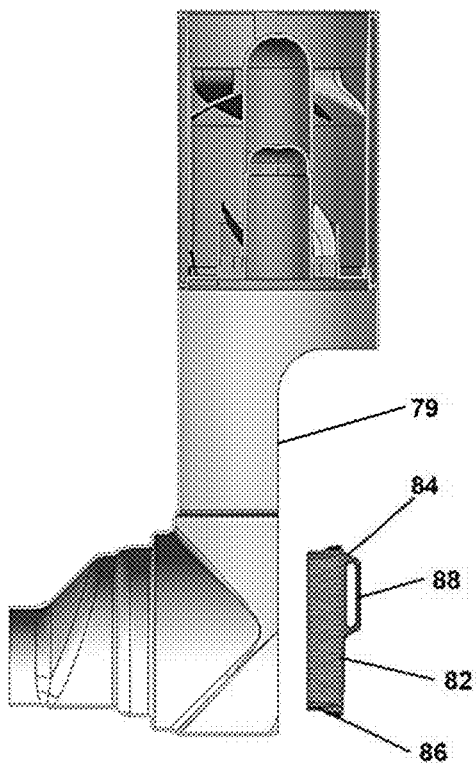
Figure 4C:
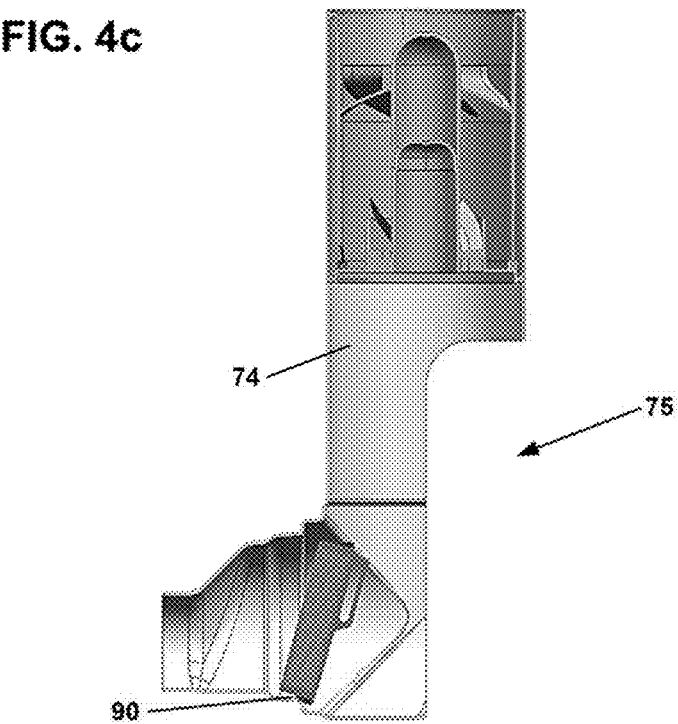
Figure 4F:
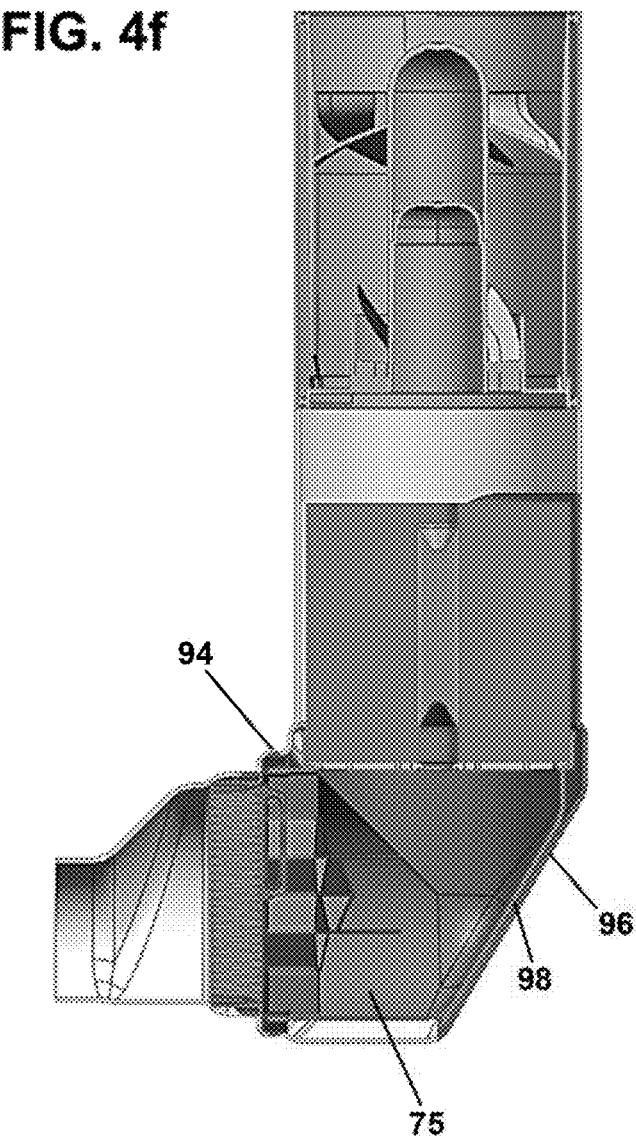

Now referring to FIGS. 4a-4f, the servicing of an air cleaner 70, generally consistent with the air cleaner shown in FIG. 3b, is shown. A precleaner 72 is depicted. Typically, dirty air enters the snorkel of the VAIS and then flows through the precleaner 72 where large particulates and water, if present, are removed. There is typically a scavenge outlet for removal of the large particulates and water from the precleaner 72. The exploded view of FIG. 4a shows an air cleaner housing 74, a safety element 76, a filter element 78, and an access cover 80. As shown in FIGS. 4b and 4c, the safety filter element includes a pleated media pack 82, a frame 84 surrounding the pleated media pack 82, and a radially directed seal 86 provided on the frame 84. The radially directed seal 86 can be molded in place or adhered as a gasket to the frame 84. Additionally shown on the safety element 76 is an optional handle 88 extending from the frame 84. The safety element can be rotated into position so that the radially directed seal 86 engages the safety sealing surface 90 on the housing 74. Once the safety element 76 is in place, the filter element 78 can be installed as shown in FIGS. 4d and 4e. As depicted, the radially directed seal 92 on the filter element 78 engages the primary seal surface 94 on the housing 74. The filter element 78 includes an elbow 77 to assist in redirecting the air from a first axial direction to a second axial direction. The elbow 77 can include an air deflector or scoop 81 to cause the air to change direction, and the air deflector or scoop 81 can be provided as a ramp 83. Once the filter element 78 is in place in the housing 74, the access cover 80 can be applied over the access opening 79 as shown in FIG. 4e. The access cover 80 can include a primary filter element support surface 96 that engages a filter element support surface 98 on the filter element 78 in order to help hold the filter element 78 in place. The access cover 80 or the access opening 79 can include a gasket to help prevent moisture from entering into the interior 75 of the housing.

Figure 5B:
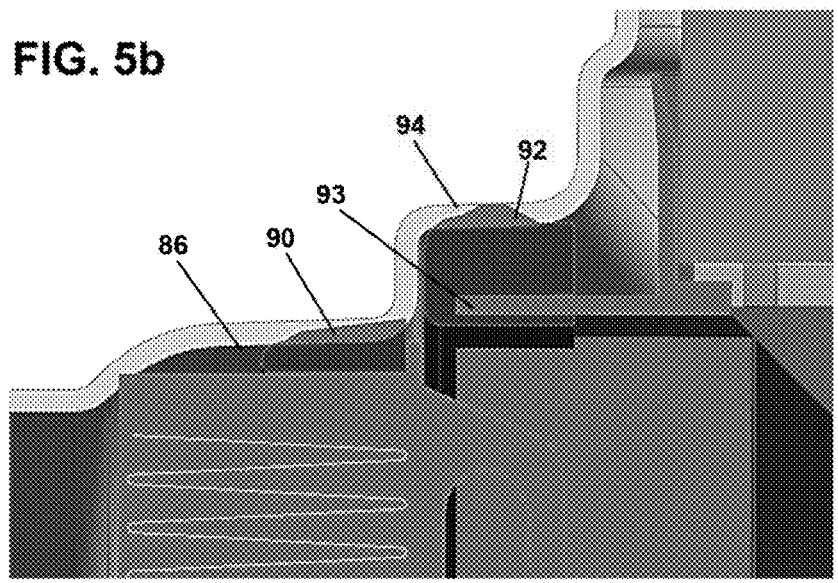

Now referring to FIGS. 5a and 5b, a more detailed showing of the engagement between the air cleaner housing 74, the safety element 76, the primary element 78, and the access cover 80 is provided. The safety element 76 includes a radially directed seal 86 that engages the safety element sealing surface 90 on the housing 74. The primary filter element 78 includes a radially directed seal 92 that engages the primary filter element sealing surface 94 on the housing 74. It is additionally pointed out that the radially directed seal 92 is supported by a seal support 93 that is part of the elbow 95 of the primary filter element 78. In general, the elbow 77 can be considered as a structure that extends from the media pack to the radial seal 92 and diverts the flow of air therethrough. The elbow 77 includes an air deflector or scoop 97 that can be provided as a ramp 99 to help divert the air flow. The access cover 80 is shown in place wherein the surface 96 supports the filter element support surface 98 and prevents the radially directed seal 92 from backing out of engagement with the primary filter element sealing surface 94 when the access cover 80 is installed. The elbow 77 can be provided from a plastic material. The primary filter element 78 can help prevent the safety 76 from backing out of engagement between the radially directed seal 86 and the safety element sealing surface 90 on the housing 74.

Now referring to FIG. 5a, the air deflector 97 is described in more detail. This characterization of the air deflector 97 should be considered as being applicable to the air deflectors identified in other embodiments of the primary filter element. In general, the air deflector 97 extends from a first end 97a to a second end 97b. The first end 97a joins the first wall 95a of the elbow 95, and the second end 97b joins the second wall 95b of the elbow 95. The location at which the first end 97a joins the first wall 95a can be observed as an area of discontinuity where there is a change in angle. Similarly, the location where the second end 97b joins the second wall 95b can be seen as a discontinuity where there is a change in angle. In general, the deflector 97 can be considered as extending from the first end 97a to the second end 97b, at an angle, relative to the first axial direction indicated by arrow A that is at least 10 degrees relative to the first axial direction indicated by arrow A and is preferable at least 15 degrees relative to the first axial direction indicated by arrow A. The angle is shown using the symbol α (alpha). Furthermore, the air deflector 97 can be considered as extending from the first end 97a to the second end 97b at an angle greater than 10 degrees relative to the second axial direction indicated by arrow B, and preferably at least 15 degrees relative to the second axial direction indicated by arrow B. The angle is shown using a symbol β (beta). It is this angular extension of the air deflector 97 that helps provide for a gradual (and non-abrupt) deflection of arrow flow that helps with air flow properties to the engine. The length of the air deflector 97 is shown as the distance DL from the first end 97a to the second end 97b. In addition, the largest distance from the first wall 95a to the seal member 92 (the location where the seal member 92 forms a seal with the housing) is indicated by the distance W1. The air deflector 97 can be considered as having a length DL that is greater than ⅓ of the length W1. It should be understood that for purposes of this measurement, the deflector DL is measured of the distance between the first end 97a and the second end 97b. The deflector 97 can be configured so that parts of it are recessed into the interior volume 91 of the elbow 77. As shown in additional embodiments, the deflector includes a hollow and even in such cases, the deflector length is the straight line distance between the first end 97a and the second end 97b.

Figure 6:
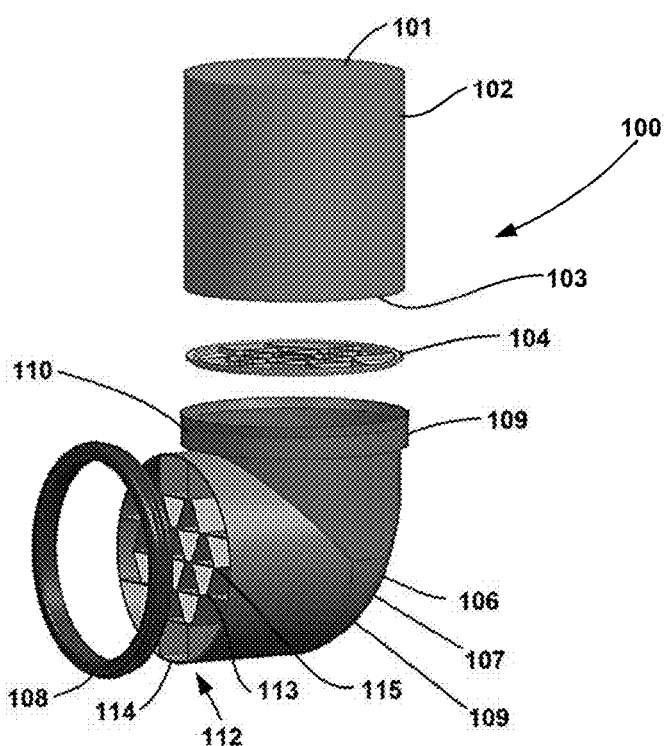

Now referring to FIG. 6, a filter element 100 is shown in an exploded view, and includes a filter media pack 102, a frame or anti-telescoping arrangement 104, an elbow 106, and a seal member 108. The media pack depicted is a z-filter media pack. The frame or anti-telescoping arrangement 104 is provided below the media pack 102 and extends across the outlet end 103 of the media pack 102, and opposite the inlet end 101 of the media pack 102. The frame 104 can also be referred to as a cross-brace arrangement. The frame or anti-telescoping arrangement 104 helps prevent the media pack 102 from telescoping. The media pack 102 can adhere to the lip 109 at the elbow first end 110. The elbow second end 112 includes a seal support 114 that supports the seal member 108. Preferably, the seal member 108 is molded to the seal support 114. In FIG. 6, the seal member 108 is shown separate from the seal support 114 for illustration. When molded onto the seal support 114, the seal member 108 is located on and adhered to the seal support 114. It should also be appreciated that the seal member 108 can be made separate from the seal support 114 and adhered to or placed on the seal support 114. In such a case, the seal member 108 can be provided as a seal ring or gasket. The elbow second end 112 includes a support structure 113 for supporting the seal support 114. The support structure 113 is exemplified as bracing 115 extending from one side to another side. The elbow 106 can be provided having an air deflector or scoop 107 (for example a ramp 109) to help divert the air flow.

Figure 7:
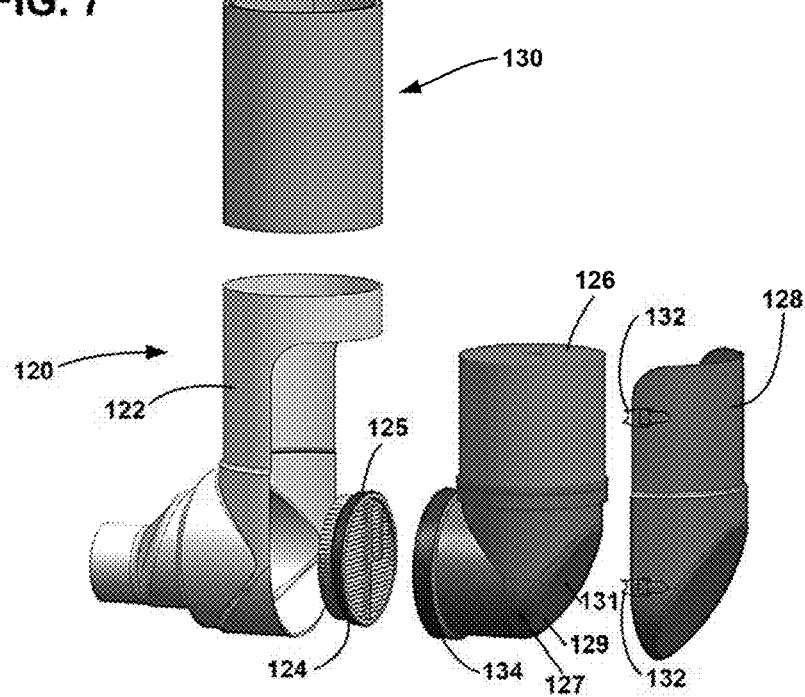
FIG. 7 is an exploded view of an alternative embodiment of a primary filtration and air diverter according to the principles of the present disclosure.
Figure 8A:
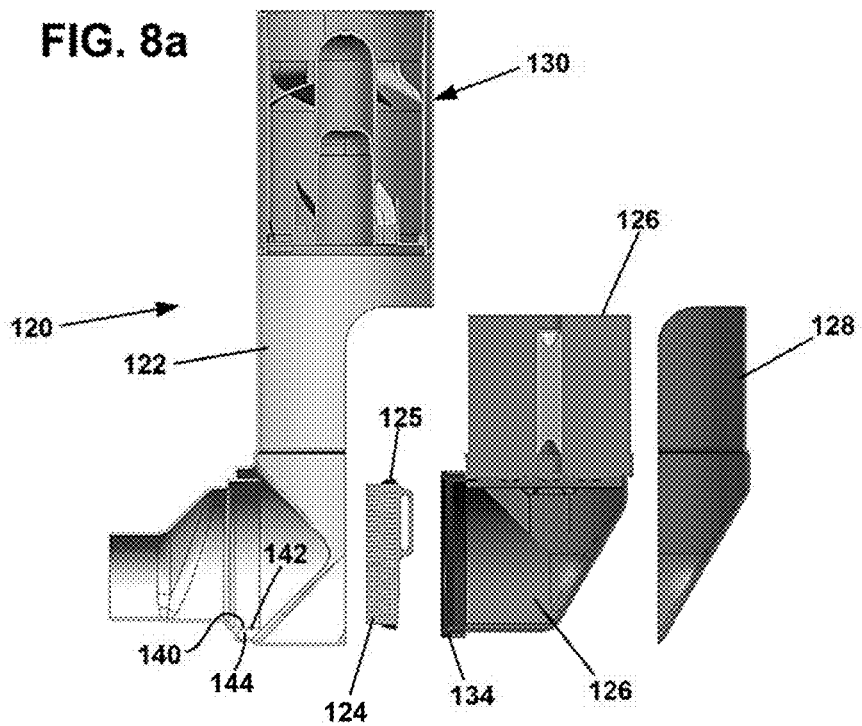
FIGS. 8a-d show servicing of the primary filtration and air diverter of FIG. 7.
Figure 8B:
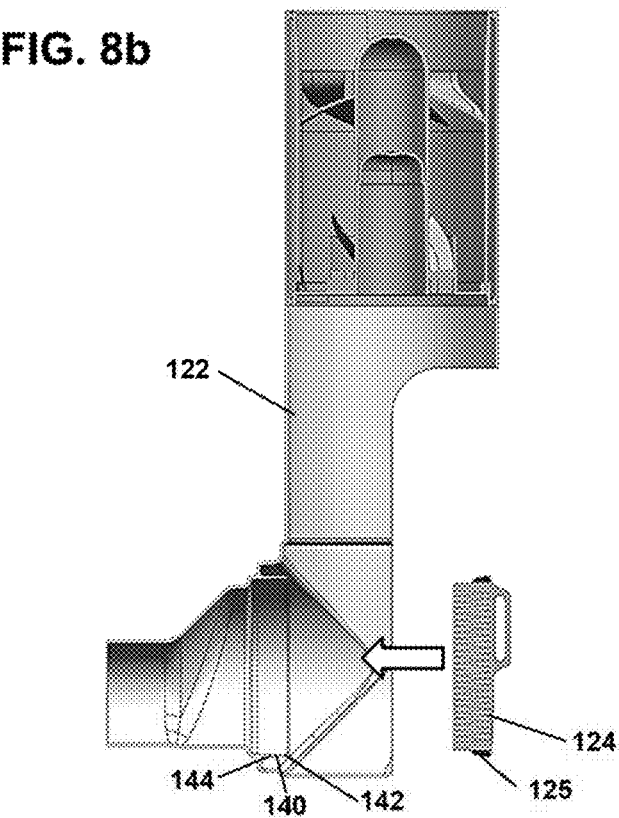
Figure 8C:
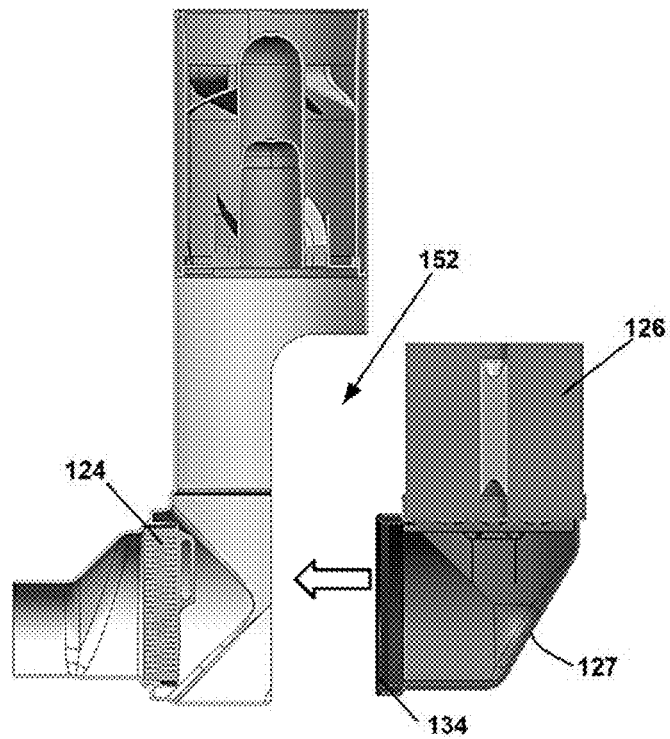
Figure 8D:
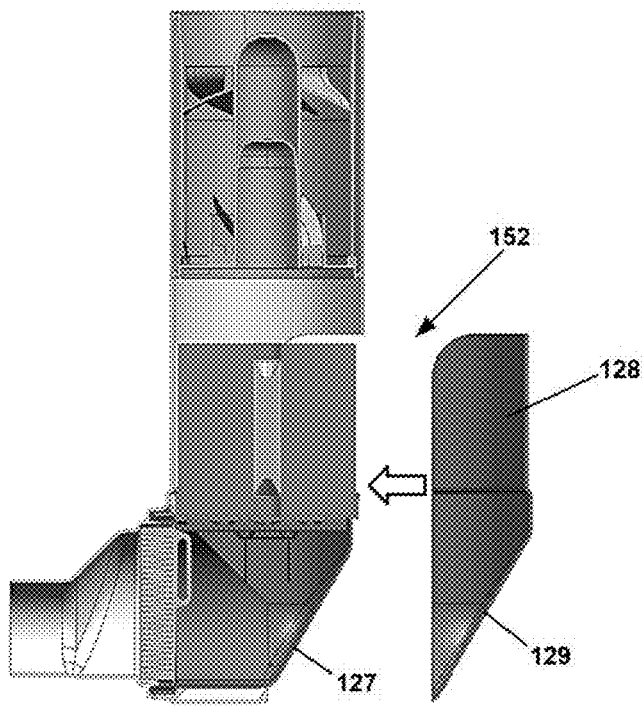

Now referring to FIG. 7, an air cleaner is shown at reference number 120 in an exploded view. The air cleaner 120 includes a housing 122, a safety element 124, a primary filter element 126, and an access cover 128. Additionally shown is a pre-cleaner region 130. Also shown on the access cover 128 are fasteners 132 for holding the access cover 128 to the housing 122. The fasteners 132 depicted can be referred to over center latches. In addition, the seal member 134 provided on the primary filter element 126 and the seal member 125 provided on the safety element 124 can be considered radial seal members. The primary filter element 126 includes an elbow 127 having an air deflector or scoop 129, and the deflector or scoop 129 can be provided as a ramp 131.

Now referring to FIGS. 8a-e, servicing of the air cleaner 120 is shown. The housing 122 includes a projection 140. The projection 140 includes a safety seal surface 142 and an opposite, primary filter element seal surface 144. The safety element 124 includes a radially directed seal member 125 that engages the safety element sealing surface 142. The radially directed seal member 125 can be referred to as an outwardly directed radial seal because the safety seal surface 142 is located outwardly from the radially directed seal member 125. The primary filter element 126 includes a radial seal member 134 that engages the primary sealing surface 144. The radial seal member 134 can be referred to an internally directed seal member because the primary sealing surface 144 is located inwardly from the radial seal member 134. In general, the servicing of the air cleaner housing 120 is similar to the servicing described in FIGS. 4a-f. In particular, the safety element 124 is introduced into the housing 122 until it is fully seated so that the seal member 125 engages the safety sealing surface 142. Next, the primary filter element 126 is introduced so that the radial seal member 134 engages the primary sealing surface 144. Next, the access cover 128 is applied over the access opening 152. The access cover 128 supports the primary filter element 126 within the housing interior and prevents the radial seal member 134 from backing out of engagement with the primary sealing surface 144 and the primary filter element 126 can help prevent the radially directed seal member 125 from backing out of engagement of the safety element seal surface 142. In particular, the access cover 128 includes a support surface 129 that conforms to and supports the air deflector 127 on the primary filter element 126. As described in more detail later, the access cover support surface may include a projection that engages a hollow on the air deflector.

Figure 9A:
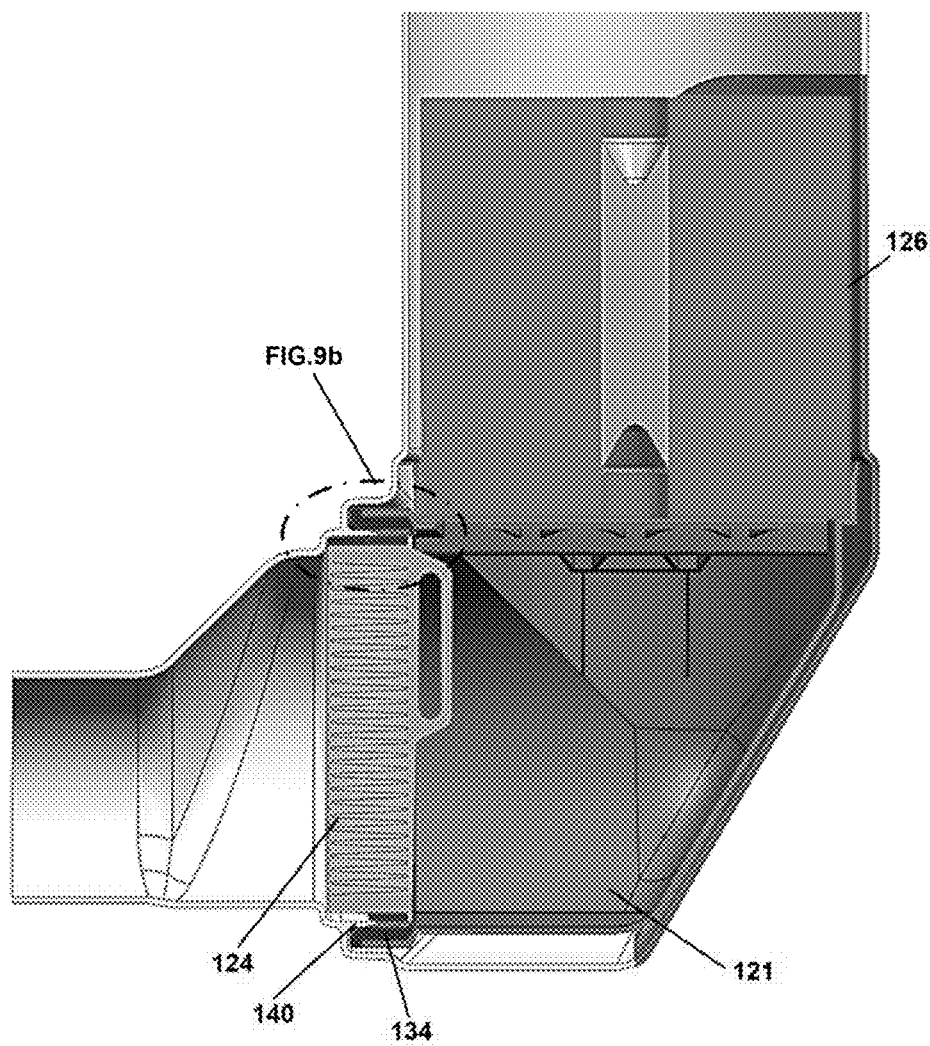
FIGS. 9a and 9b are sectional views of the primary filtration and air diverter of FIG. 7.
Figure 9B:
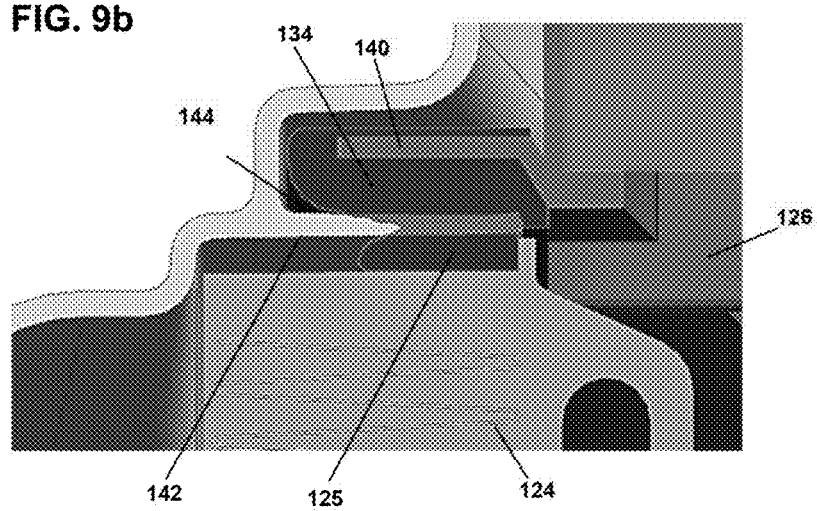

FIGS. 9a and 9b illustrate the orientation of the safety filter element 124 and the primary filter element 126 relative to the housing projection 140. Space can be saved by providing that the safety element 124 and the primary filter element 126 seal to the projection 140. As shown, the primary filter element 126 includes a radial seal member 134 that engages the primary filter element seal surface 144. In addition, the safety element 124 includes a radial seal member 125 that engages the safety sealing surface 142. The safety element 124 and the primary element 126 are engaged in an overlap relationship at the location of the projection 140. In addition, it is pointed out that the projection 140 forms part of the housing.

Figure 10:
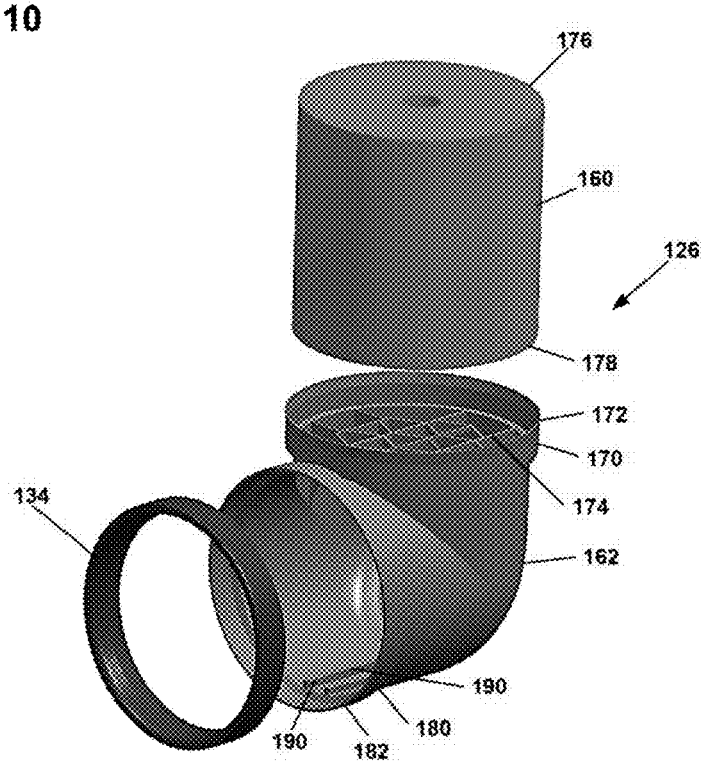
FIG. 10 is an exploded view of an alternative embodiment of a filter element according to the principles of the present disclosure for use in an alternative primary filtration and air diverter.

Now referring to FIG. 10, an exploded view of the primary filter element 126 is shown. The primary filter element 126 includes a z-media pack 160, an elbow 162, and a seal member 134. The z-media pack 160 can be referred to as a filter construction that includes a z-media pack. The elbow 162 includes a first end 170 having a lip 172 and a frame or anti-telescoping arrangement 174. The media pack 160 includes an inlet end 176 and an outlet end 178. The outlet end 178 rests on the brace or anti-telescoping arrangement 174, and the outer periphery of the media pack 160 adheres to the lip 172 by an adhesive. The elbow 162 includes a second end 180 having a lip or a seal support 182. The seal member 134 is preferably molded to the seal support 182 but can be provided as a gasket adhered to the seal support 182. The elbow additionally can include a plurality of ribs 190 that help ensure that the safety element remains in place in a sealed relationship with the housing. That is, the plurality of ribs 190 helps to prevent the safety filter element from backing out so that the radially directed seal member 125 remains in a radially directed sealing arrangement with the projection 140.

Figure 11A:
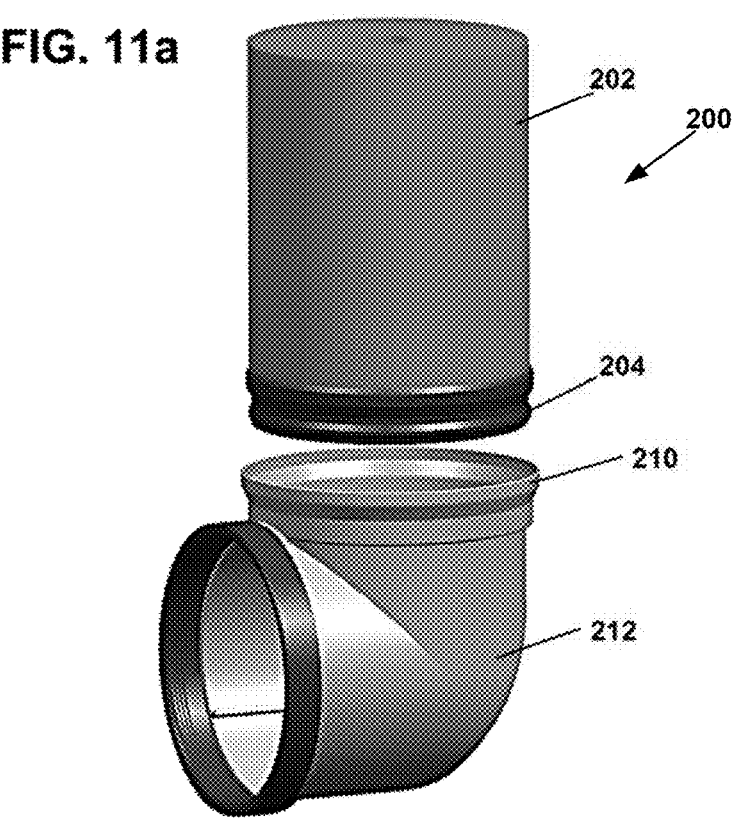
FIGS. 11a and 11b show an alternative embodiment of a filter element according to the principles of the present disclosure where the media pack is not adhered to the elbow but is, instead, sealed to the elbow.
Figure 11B:
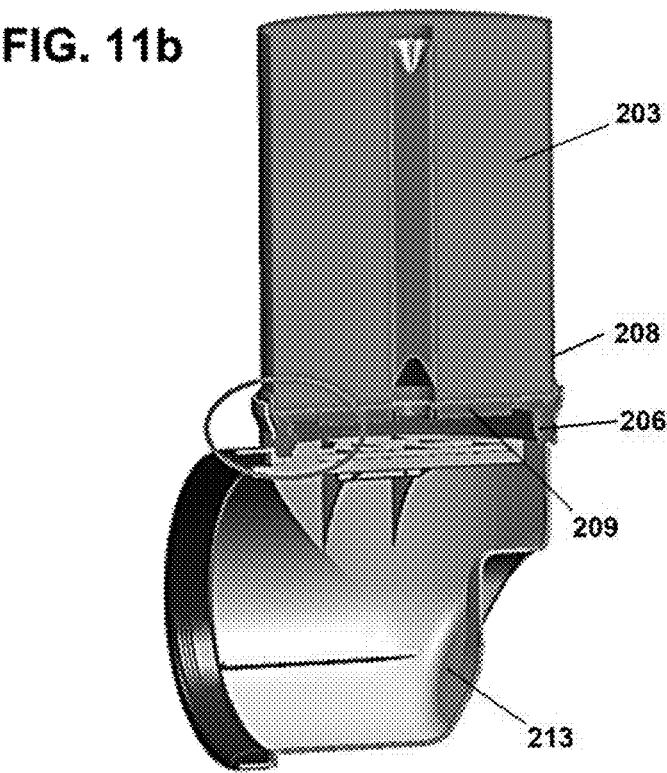

Now referring to FIGS. 11a and 11b, an alternative embodiment of a filter element is shown at reference number 200. The filter element 200 includes a media pack construction 202 that is consistent with the filter element described in International Publication No. WO 2005/063361. The entire disclosure of International Publication No. WO 2005/063361 is incorporated herein by reference. The media pack construction 202 can also be provided according to the filter element according to U.S. Pat. No. 6,350,291, the entire disclosure of which is incorporated herein by reference. The media pack construction 202 includes a z-filter media pack 203 and a radially directed seal member 204 supported by a preform 206. The preform 206 includes a frame or anti-telescoping arrangement 209 that helps prevent the media pack 203 from telescoping and that also helps support the radially directed seal member 204. The radially directed seal member 204 engages the lip 210 on the elbow 212. In this manner, the filter element 200 seals to the elbow 212 as a releasable seal. That is, the filter element 200 is not adhered to the elbow, and the filter element 200 can be replaced without replacing the elbow 212. Furthermore, the elbow 212 includes an air deflector or scoop 213 that helps move the flowing air from a first axial direction to a second axial direction while minimize air flow disturbances.

Figure 12A:
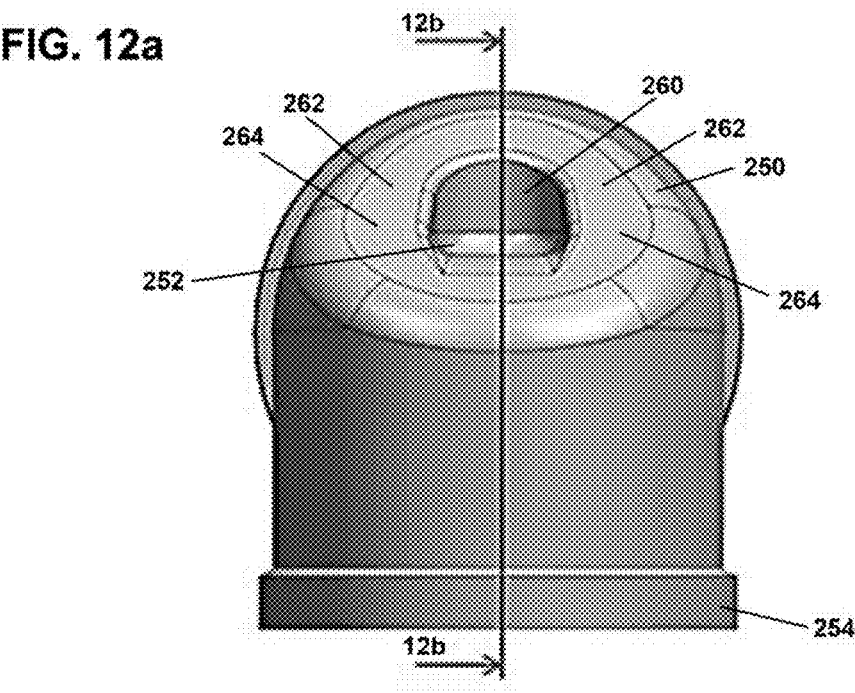
FIGS. 12a and 12b show an exemplary elbow.
Figure 12B:
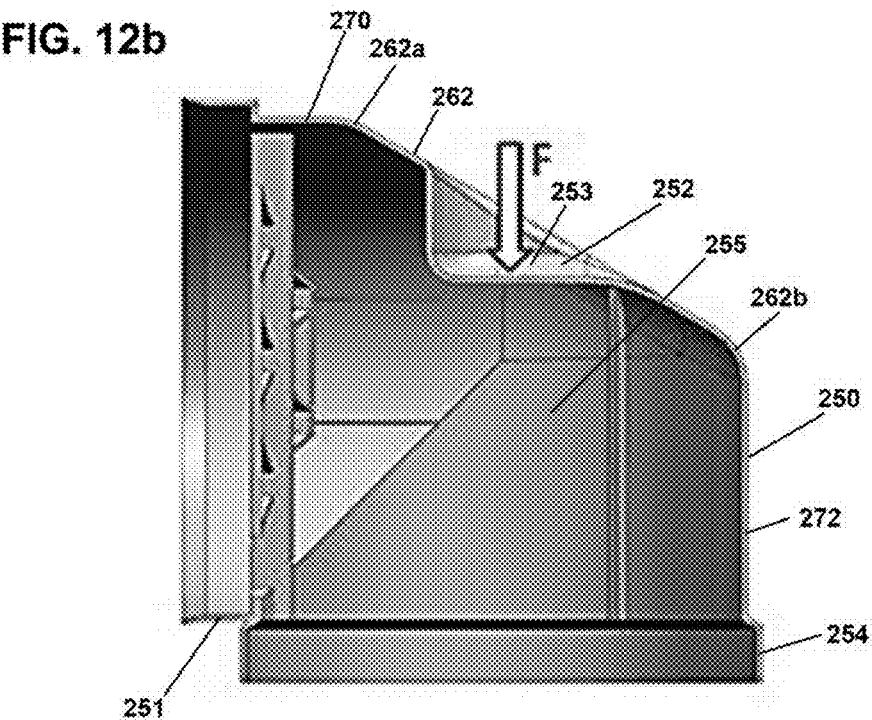

Now referring to FIGS. 12a and 12b, an alternative embodiment of the elbow 250 is depicted. The elbow 250 includes a step 252. The step 252 is advantageous because, when molding a seal onto the second end 254, pressure can be applied in the direction of the arrow F by application to a flat and level surface 253. As a result, molding the seal onto the second end 254 is simplified and the pressure directed by the elbow 250 into the mold can be relatively even around the perimeter of the second end 254 because the application of force onto the flat and level surface 253 (level relative to the second end 254). The step 252 can be considered an indented or hollow portion of the elbow 250 that extends into the interior volume 255 of the elbow 250 to create a hollow portion 260 on the exterior of the elbow 250. The step 252 can be provided surrounded by the air deflector or scoop 262, and the air deflector or scoop 262 can be considered a ramp 264 even though there is a hollow portion 260 therein. The deflector or scoop 262 is located between the elbow first end 251 and the elbow second end 254, and helps divert air flow. Furthermore, the step 252 allows the primary filter element to be supported by an access cover having a corresponding structure for engaging the step 252. By providing corresponding structure on the access cover for engaging the step 252, the person servicing the air cleaner can be sure that the primary filter cartridge is correctly installed in order for the access cover to correctly fit over the access opening of the air cleaner housing when both the access cover and the primary filter element include the corresponding step structure.

The elbow 250 can be seen as having a first wall 270 extending from the elbow first end 251, and a second wall 272 extending from the elbow second end 254. The deflector 262 includes a deflector first end 262a that joins the first wall 270 at a location of angular discontinuity, and a second end 262b that joins the second wall 272 at a location of angular discontinuity. A location of angular discontinuity can be considered a location where the angle noticeably changes by, for example, at least 2 or 3 degrees.

Figure 13A:
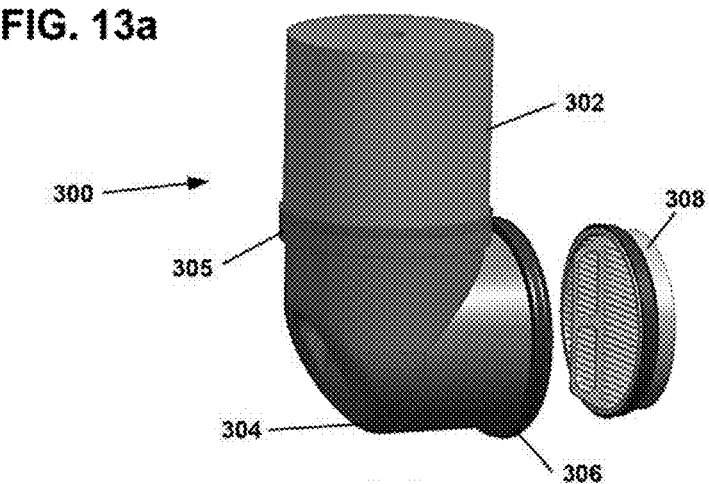
FIGS. 13a-13d show exemplary alternative embodiments of a filter element according to the principles of the present disclosure with alternative shapes of the media pack and the elbow.
Figure 13B:
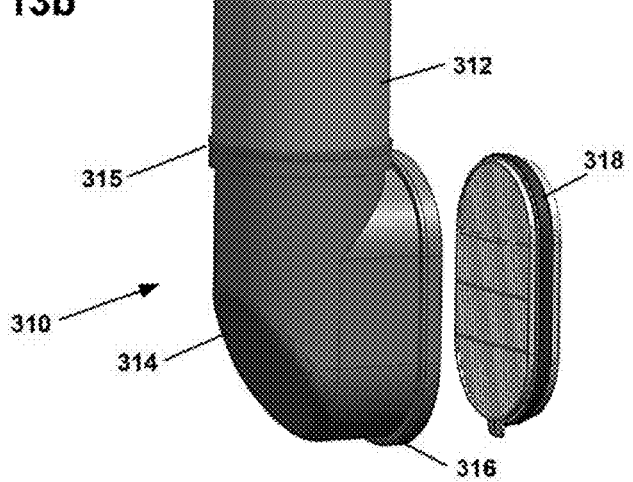
Figure 13C:
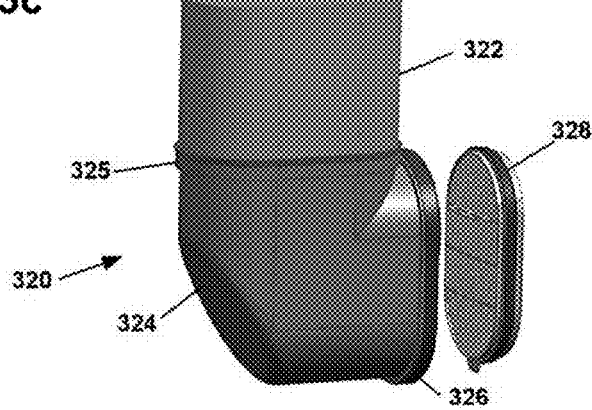
Figure 13D:
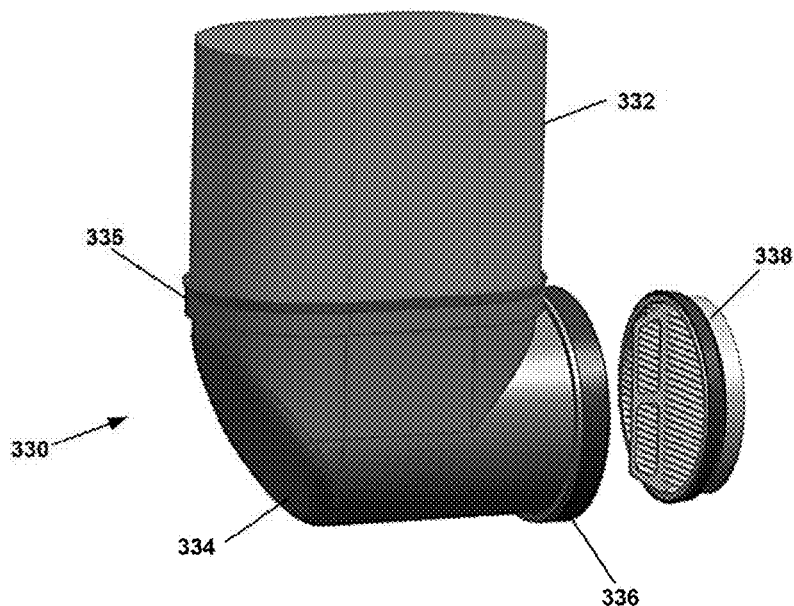

The primary filter element and the safety element (or secondary filter element) can be provided having various shapes. Exemplary shapes include circular and non-circular. Exemplary non-circular shapes include obround, oval, and racetrack. An exemplary racetrack configuration is one where there are two straight opposite sides connected by two rounded ends. Now referring to FIG. 13a, the primary filter element 300 includes a circular media pack 302 and an elbow 304 having a first end 305 that is circular shaped to correspond with the circular shaped media pack 302, and a second end 306 that is circular shaped to correspond with the circular shape of the safety element 308. Now referring to FIG. 13b, a primary filter element 310 is shown having a media pack 312 that has a circular shape, an elbow 314 having a first end 315 that is circular shaped to correspond with the circular shape of the media pack 312, and a second end 316 that is non-circular, and a safety element 318 that is non-circular. The second end 316 and the safety element 318 can be referred to as racetrack shaped. Now referring to FIG. 13c, the primary filter element 320 is shown having a media pack 322 that is non-circular, an elbow 324 having a first end 325 that is non-circular to correspond with the non-circular shape of the media pack 322, and having a second end 326 that is non-circular to correspond with the non-circular shape of the safety element 328. The non-circular shapes in FIG. 13c can be characterized as racetrack shaped. Now referring to FIG. 13d, the main filter element 330 includes a non-circular media pack 332 and an elbow 334 having a first end 335 having a non-circular shape to correspond with the non-circular shape of the media pack 332, and a second end 336 having a circular shape corresponding to the circular shape of the safety element 338. It should be appreciated that the elbow first end 305, 315, 325, and 335 can have a shape corresponding to the shape of the media pack 302, 312, 322, and 332, respectively. The elbow second end 306, 316, 326, and 336 can have a shape that corresponds to the seal surface of the air cleaner housing. The shape can be circular or non-circular (such as, obround, oval, and racetrack). The elbow first end and the elbow second end can have shapes that are the same or different.

Figure 14:
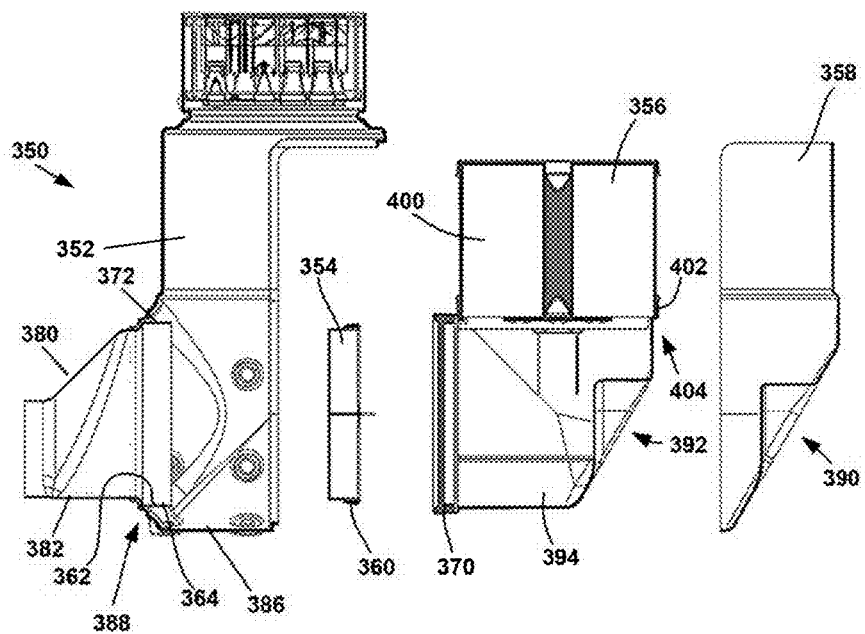
FIG. 14 shows an exploded view of an alternative primary filtration and air diverter according to the principles of the present disclosure.
Figure 15A:
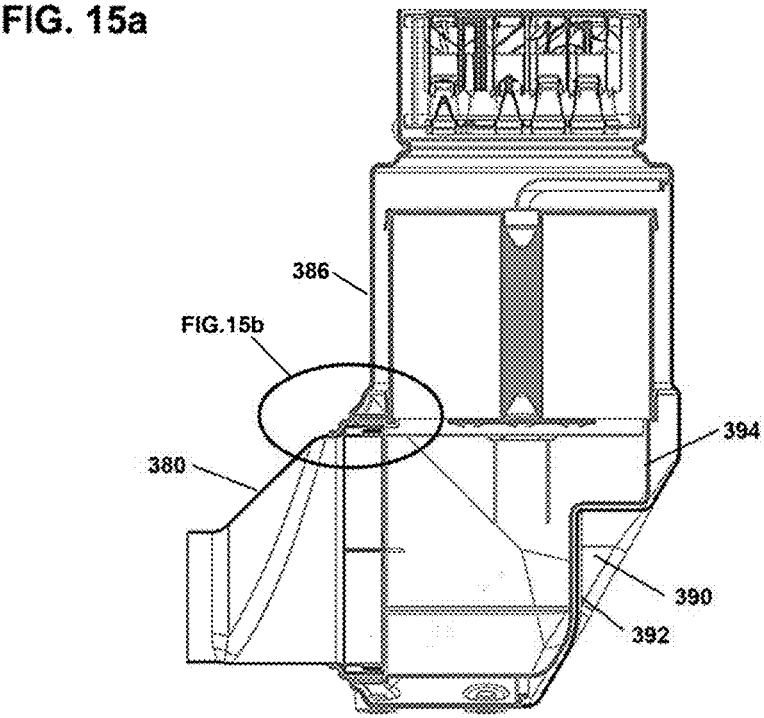
FIGS. 15a-15c show the primary filtration and air diverter according to FIG. 14.
Figure 15B:
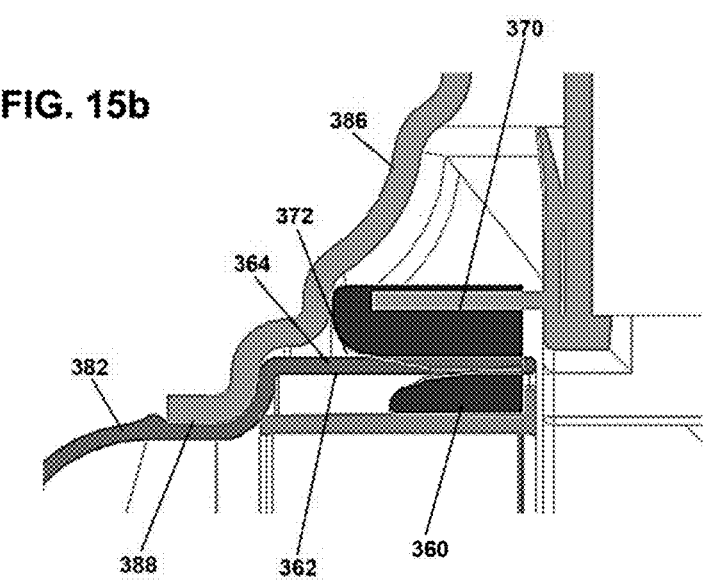
Figure 15C:
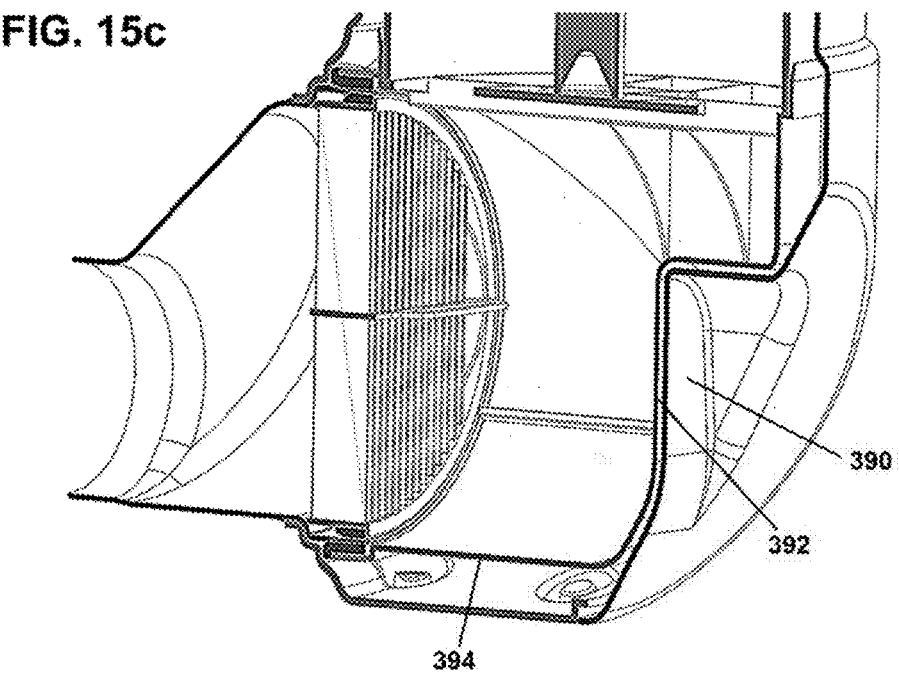

Now referring to FIG. 14, an exploded view of an air cleaner is illustrated. The air cleaner 350 includes a housing 352, a safety element 354, a primary element 356, and an access cover 358. The safety element 354 includes an externally directed radial seal 360 that engages the safety sealing surface 362 on the extension 364 that is part of the housing 352. The primary filter element 356 includes an internally directed radial seal 370 that engages the primary filter element sealing surface 372 on the extension 364 that forms part of the housing 352. A detailed depiction of this is shown in FIGS. 15a-c. As additionally illustrated, the housing 352 includes an outlet portion 380. In the configuration shown, the outlet portion 380 forms a part of the housing 352. In particular, the outlet portion 380 includes a wall structure 382 that includes the support 364. The air cleaner housing 352 includes a wall 386. The wall 382 and the wall 386 join together at a seam 388. The wall 382 and the wall 386 can join together as a result of a snap-fit arrangement. The wall 382 and the wall 386 can be attached by alternative techniques such as by fasteners including screws or bolts, or by adhesive. In addition, the access cover 358 includes a recess or hollow 390 that engages a corresponding recess or hollow 392 in the elbow 394.

For the filter element 356, the media pack 400 engages a lip 402 on the first end 404 of the elbow 394 by adhering thereto as a result of an adhesive. Accordingly, the media pack 400 is shown adhesively bonded to the elbow 394 at the lip 402. It is the exterior of the filter media pack that is adhered to the lip 402, as shown. Of course, the face of the media pack 400 can be adhered to the first end 404 of the elbow 394, but adhering the face of the media 400, even along a periphery of the face, can result in blockage of media. If the media pack 400 is adhered to the first end 404 of the elbow 394 along the outlet face of the media pack 400, the lip 402 can be omitted.

Figure 16A:
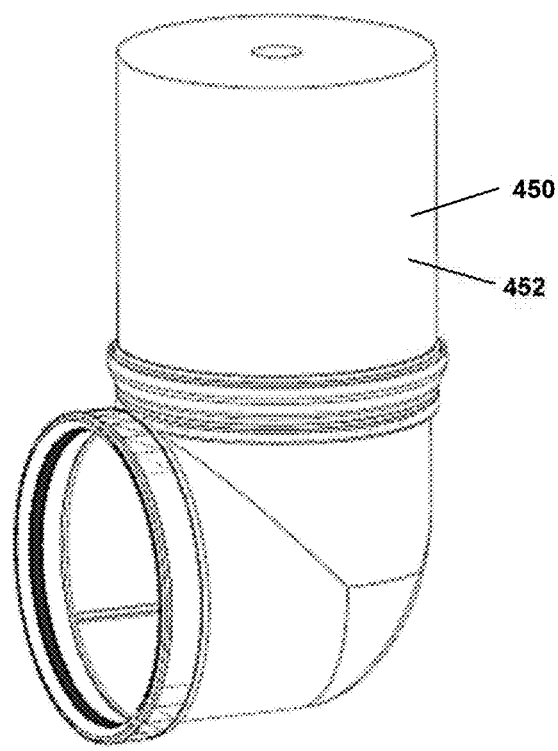
FIGS. 16a-16c show an alternative embodiment of a filter element according to the principles of the present disclosure.
Figure 16B:
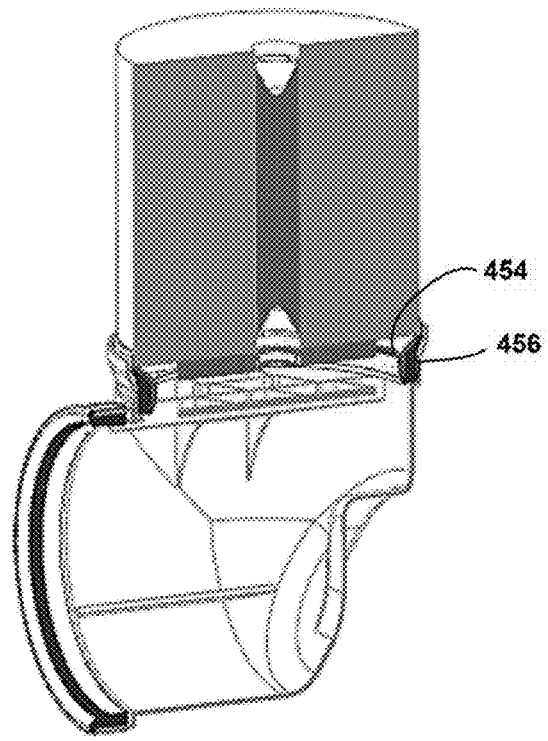
Figure 16C:
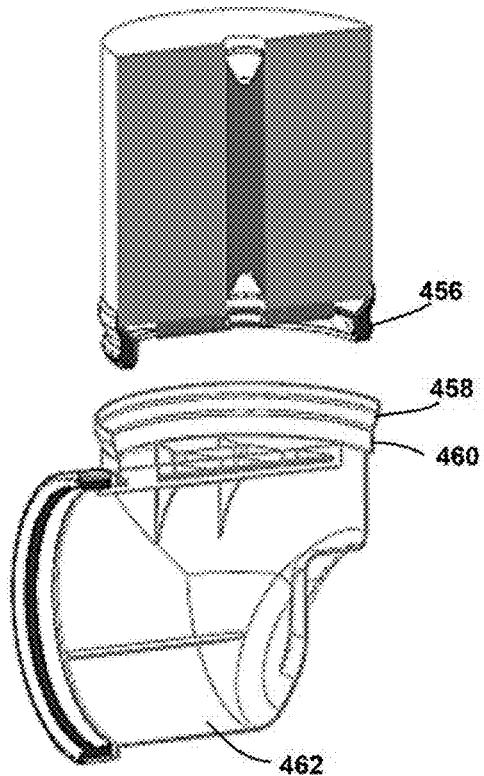

An alternative embodiment is depicted in FIGS. 16a-c. In FIG. 16a, a media pack arrangement is shown at reference number 450. The media pack arrangement 450 includes a media pack 452 which is illustrated as a coiled z-filter media pack. The media pack arrangement 450 additionally includes a preform 454 and an externally directed radial seal member 456 molded to the preform 454. The externally directed radial seal 456 can engage the lip 458 at the first end 460 of the elbow 462. The media pack arrangement 450 is described, for example, in International Publication No. WO 2005/063361, the entire disclosure of which is incorporated herein by reference.

Figure 17A:
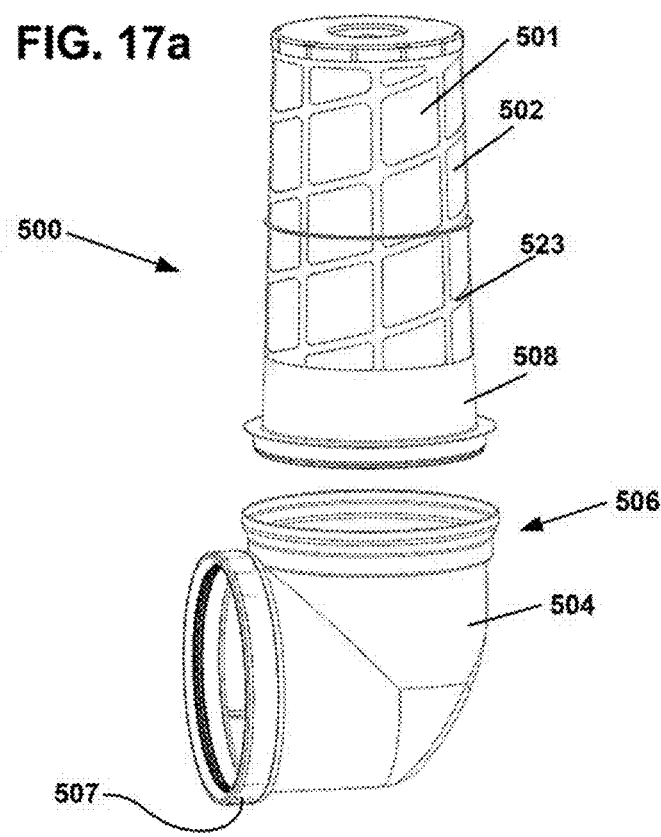
FIGS. 17a-17c show an alternative embodiment of a filter element according to the principles of the present disclosure.
Figure 17B:
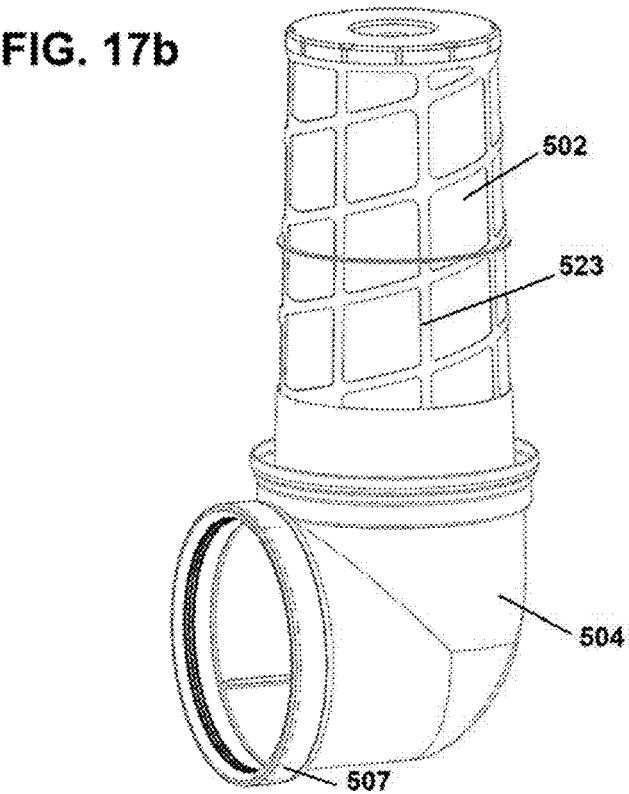
Figure 17C:
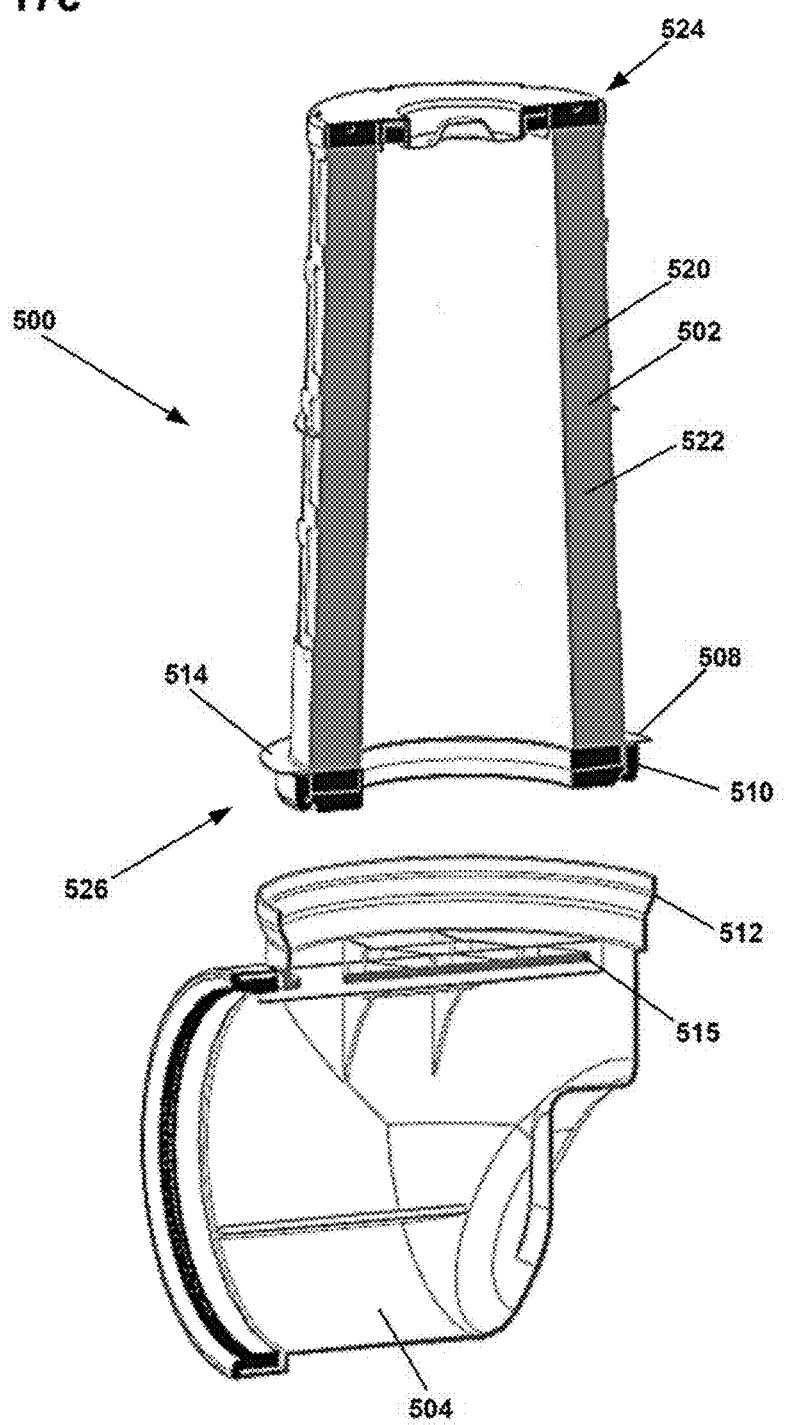

Now referring to FIGS. 17a-c, an alternative primary filter element is shown at reference number 500. The primary filter element 500 includes a filter arrangement 501 and an elbow 504. The filter arrangement 501 includes a pleated media pack 502. The filter arrangement 501 can be adhered to the elbow 504 at the elbow first end 506. In the embodiment depicted, the filter arrangement 501 includes a preform 508 that includes a seal member 510 provided thereon. The seal member 510 can engage the lip 512 of the first end 506. In addition, the preform 508 can include a flange 514 that can act as a stop. The elbow support 515 can also be used as a stop to prevent the filter arrangement 501 from descending too far into the elbow 504. In addition, the media pack arrangement 502 can include a cylindrical or conical pleated media pack 520. The media pack shown can be considered conical shaped because one end 526 has a greater cross section area than the other end 524. The cylindrical or conical media pack 520 can be supported by a support structure 523. The seal member 510 depicted is an externally directed radial seal member. The seal arrangement can be provided as an axial seal arrangement consistent with, for example, the axial seal arrangement described in U.S. Pat. No. 7,070,642. The entire disclosure of a pleated cylindrical filter element according to U.S. Pat. No. 7,070,642 and how the filter element can form a seal with a housing is incorporated herein by reference in its entirety. In addition, the entire disclosure of U.S. Pat. No. 8,066,791 is incorporated herein by reference. In addition, the entire disclosure of U.S. application Ser. No. 13/662,022, now U.S. Pat. No. 8,864,866, is incorporated herein by reference.

Similar to FIGS. 13a-d, the media pack 520 can be provided having a circular or non-circular cross sectional shape (i.e., oval, obround, race track) and the elbow 504 can have a first end 506 having a shape corresponding to the shape of the media pack 520. In addition, the elbow second end 507 can have a circular or non-circular shape (i.e., oval, obround, race track). If a safety element is present in the elbow second end 507, the safety element can have a shape corresponding to the elbow second end 507. The various shapes can be selected so that the air cleaner can fit within a specified volume.

Figure 18B:
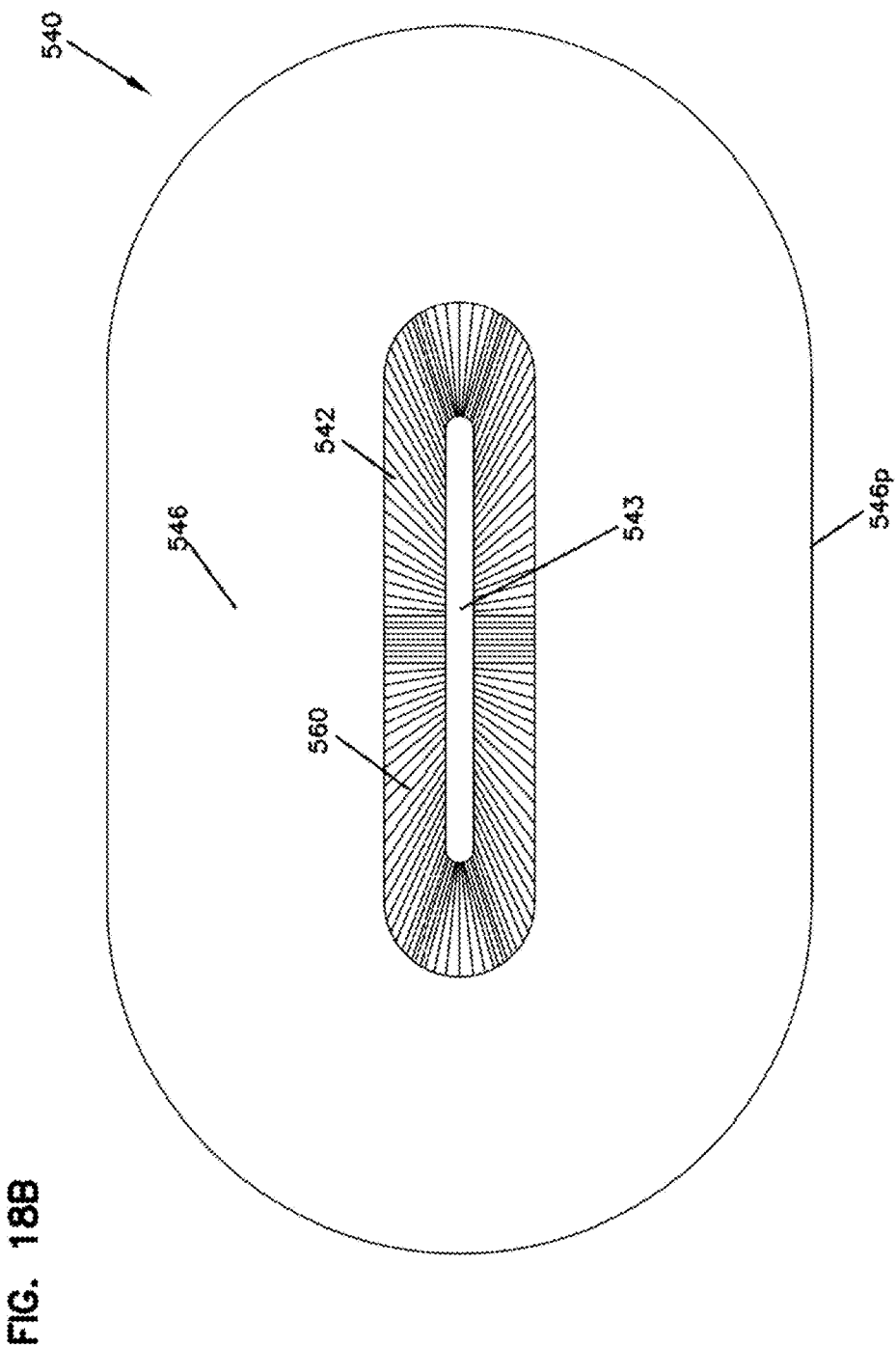
Figure 18C:
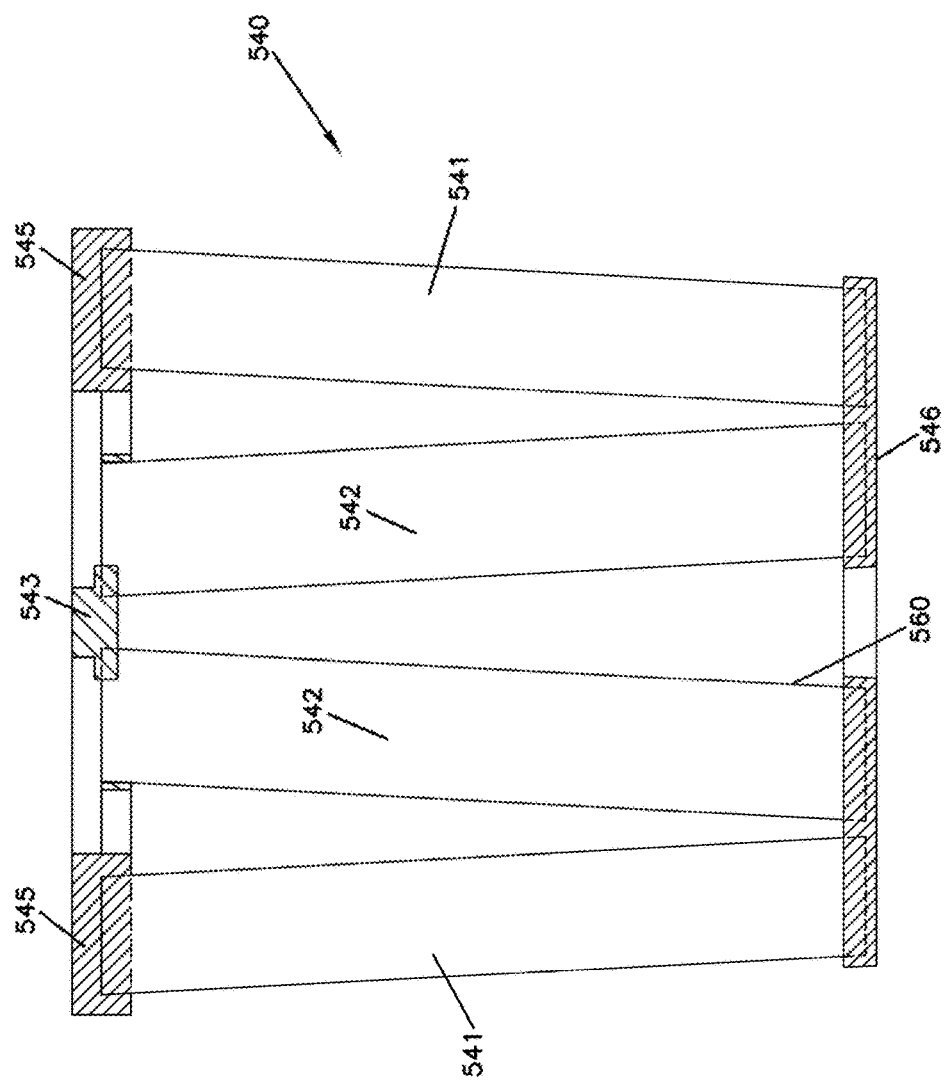
FIG. 18c is a schematic cross-sectional view of the media pack of FIGS. 18a and 18b.

In addition to z-media filter constructions and conical or cylindrical, pleated media packs, alternate types of media packs that involve flutes extending between opposite ends can be used with selected principles according to the present disclosure. An example of such alternate media pack is depicted in FIGS. 18a-18c. The media pack of FIGS. 18a-18c is analogous to one depicted and described in DE 20 2008 017 059 U1; and as found in arrangements available under the mark "IQORON" from Mann & Hummel.

Referring to FIG. 18a, the media pack is indicated generally at 540. The media pack 540 comprises a first outer pleated media loop 541 and a second, inner, pleated media loop 542. The view of FIG. 18a is toward a media pack (flow) end 545. The end 545 depicted, can be an inlet end or an outlet end, depending on selected flow direction. For many arrangements using principles characterized having the media pack 540 would be configured in a filter cartridge such that end 545 is an inlet flow end.

The outer pleated media loop 541 is configured in an oval shape, though alternatives are possible. At 550, a pleat end closure, for example molded in place, is depicted closing ends of the pleats 541 at media pack end 545.

Pleats 542 are positioned surrounded by and spaced from loop 541, and thus pleated media loop 542 is also depicted in a somewhat oval configuration. In this instance, ends 542e of individual pleats 542p in a loop 542 are sealed closed. Also, loop 542 surrounds the center 542c that is closed by a center strip 543 of material, typically molded in place.

During filtering, when end 545 is an inlet flow end, air enters gap 555 between the two loops of media 541, 542. The air then flows either through loop 541 or loop 542, as it moves through the media pack 540, with filtering.

In the example depicted, loop 541 is configured slanting inwardly toward loop 542, in extension away from end 545. Also spacers 556 are shown supporting a centering ring 557 that surrounds an end of the loop 542, for structural integrity.

In FIG. 18b, an end 546 of the cartridge 250, opposite end 255 is viewable. Here, an interior of loop 542 can be seen, surrounding an open gas flow region 560. When air is directed through cartridge 540 in a general direction toward end 546 and away from end 545, the portion of the air that passes through loop 542 will enter central region 560 and exit therefrom at end 546. Of course air that has entered media loop 541, FIG. 18a, during filtering would generally pass around (over) an outer perimeter 546p of end 546.

In FIG. 18c a schematic cross sectional view of cartridge 540 is provided. Selected identified and described features are indicated by like reference numerals.

It will be understood from a review of FIGS. 18a-18c, the above description, that the cartridge 540 described, is generally a cartridge which has flutes extending in a longitudinal direction between opposite flow ends 545, 546.

In the arrangement of FIGS. 18a-18c, the media pack 540 is depicted with an oval, in particular racetrack, shaped perimeter. It is depicted in this manner, since the air filter cartridges in many examples below also have an oval or racetrack shaped configuration.

Figure 19:
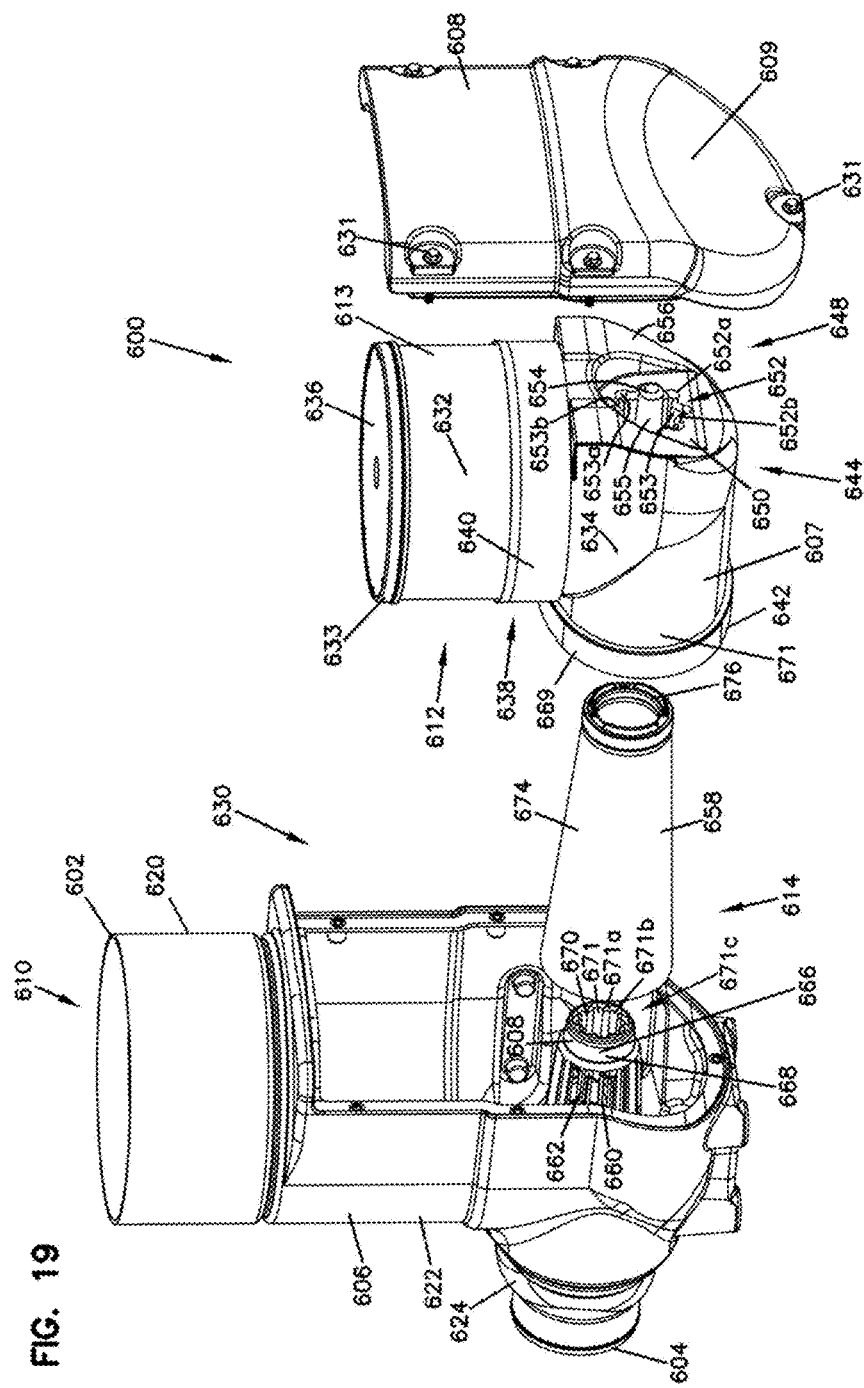
FIG. 19 is an exploded, perspective view of an alternative embodiment of a primary filtration and air diverter according to the principles of the present disclosure.
Figure 20:
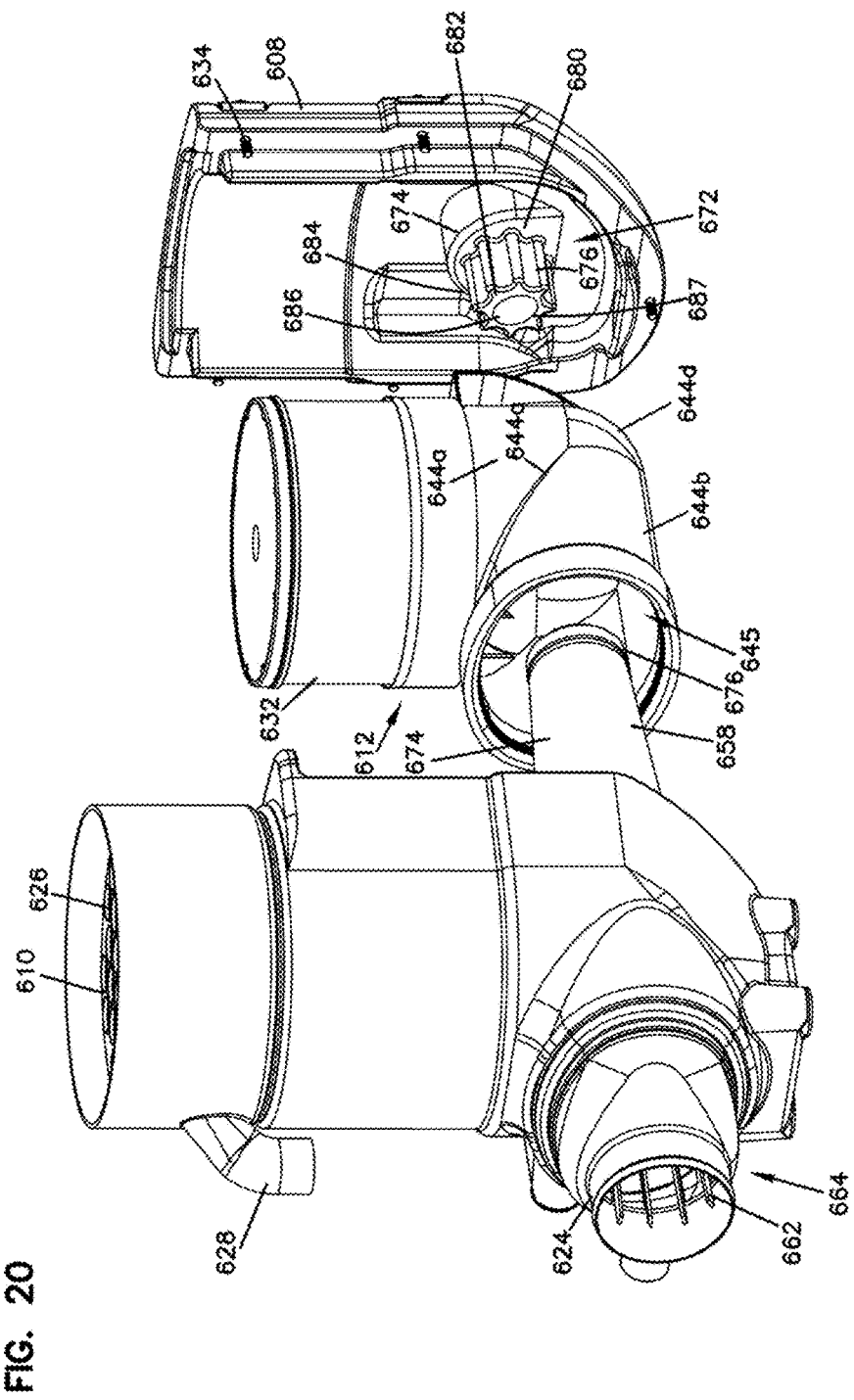
FIG. 20 is an exploded, perspective view of the primary filtration and air diverter according to FIG. 19.

Now referring to FIGS. 19-20, an alternative primary filtration and air diverter is shown at reference number 600. The primary filtration and air diverter 600 can be provided as a part of a region of the vertical air intake system 10 shown in FIGS. 1 and 2.

The primary filtration and air diverter 600 includes an air inlet 602, an air outlet 604, a housing 606, an access cover 608, a precleaner 610, a primary filter element 612, and a secondary filter element 614. The housing 606 includes a precleaner region 620, a primary filter region 622, and an outlet region 624. The precleaner 610 can be provided within the precleaner region 620. It should be understood that the precleaner region 620 can be provided without a precleaner or the precleaner region can be omitted. In addition, a precleaner can be provided further upsteam, for example, in the vertical air intake system 10. The precleaner 610 can be provided with one or more inertial separators 626, and can be provided with a scavenge 628 for the removal of particulates from the precleaner 610. The housing 606 includes an access opening 630 for servicing the primary filter element 612 and the secondary filter element 614. The access opening 630 receives the access cover 608 that closes the access opening 630 and also holds the primary filter element 612 and the secondary filter element 614 in place. The housing 606 is shown with fastener elements 631 for holding the housing 606 in place. The fastener elements are shown as bolts. Of course, alternative fastening elements are available such as over center latches.

The primary filter element 612 includes a media arrangement 613 and an elbow 634. The media arrangement 613 includes a filtration media pack 632. The filtration media pack 632 includes a first end 636 for receiving dirty air, and a second end 638 for discharging clean air. The first end 636 includes an optional ring member 633 provided therearound to help protect the media pack. The filtration media pack 632 is provided as a z-filter media pack, but could be any other media pack that provides for an upstream inlet and a downstream outlet. For example, cylindrical or conical pleated media can be used as discussed in context of FIGS. 17a-17c, double pleated media as described in the context of FIGS. 18a-18c, and pleated panel media as described in the context of FIGS. 22a-22c and 23a and 23b. The elbow 634 includes a first end 640 that attaches to the media pack second end 638, a second end 642 that attaches to the housing 606, and an air flow enclosure 644 that diverts air flowing from the elbow first end 640 to the elbow second end 642. The elbow 634 can be referred as a shell, and the first end 640 can be provided so that it extends up along a portion of an exterior side of the media pack 632. It is not necessary for the first end 640 to extend all the way to the media pack first end 636 although that is certainly possible. The second end 642 includes a seal member 669 for sealing to the housing 606.

The air flow enclosure 644 includes an interior volume 645 that is constructed to receive the secondary filter element 614. The air flow enclosure 644 includes a first wall 644a and a second wall 644b. The first wall 644a extends from the first end 640, and the second wall 644b extends from the second end 642. The first wall 644a and the second wall 644b come together at the seam 644c and, in combination with the air deflector 644d form the interior volume 645 that is an enclosed structure so that air flowing from the first end 640 in a first axial direction is changed to a second axial direction when flowing through the second end 642. In addition, the air flow enclosure 644 includes a receiver end 648 that is constructed to fit between the secondary filter element 614 and a portion of the access cover 608. The receiver end 648 includes the air deflector 644d as a part thereof. The receiver end 648 includes a flat portion 650, a recessed portion 652, and a projection portion 654. The flat portion 650 is provided recessed from an outer portion 656 of the diverter portion 644 that is located closest to the exterior surface 609 of the access cover 608. In general, the flat portion 650 is provided recessed from the outer portion 656 and provides a surface against which pressure can be applied when molding the seal member 669 onto the elbow second end 642. The outer portion 656 can be considered the air deflector 644d because it provides for a gradual change in the direction of air flow from the first axial direction to the second axial direction. The recessed portion 652 is located between the flat portion 650 and the projection portion 654, and can be provided with an outer surface 653 that can be characterized as having a serpentine surface shape that includes alternating outwardly curved, concave sections 653a and inwardly projecting convex portions 653b. The serpentine surface shape can also be referred to as a petal arrangement. The recessed portion 652 can additionally include an interior surface 655 that forms part of the projection portion 654. The inner surface 655 can be provided as relatively smooth and cylindrical or conical. The petal arrangement can be considered a flower shape, and alternative shapes are possible such as polygonal, circle, and oval. In addition, the polygonal shape can be a regular polygon where each side has an equal length and the angles between each side are equal, or an irregular polygon shape where either the lengths of the size are different or the angles between sides are different. It should also be appreciated that the corresponding shape can be provided on the portion of the access cover 608 that engages the receiver end 648.

The seal member 669 is shown disposed on the seal support 671 of the elbow second end 642. When in place on the housing 606, the seal member 669 forms an internally directed radial seal with the projection 673 that forms part of the housing 606. The seal member 669 is provided as an internally directed radial seal, and the shape of the seal member can be considered non-round such as oval. The seal member 669 can be provided having a round shape or another non-round shape such as race track shaped or rectangular. In general, the shape is meant to refer to the overall seal configuration as opposed to the cross section along a part of the seal member.

The secondary filter element 614 includes a conical filter element 658 arranged covering a tower support 660 that is provided extending from the housing 606. The tower support 660 includes support members 662 that extend from a tower first end 664 to a tower second end 666. The tower first end 664 is provided near the air outlet 624. The tower second end 666 includes an exterior continuous surface 668 for allowing the secondary filter element 614 to seal thereto, and an interior surface 670 configured to receive the recessed portion 652 of the receiver end 648 of the primary filter element 612. The interior surface 670 can be characterized as having a serpentine surface shape 671 having alternating outwardly curved concave sections 671a and inwardly projecting convex portions 671b. As a result, the tower serpentine surface 671 can engage the elbow or shell serpentine surface 653. It should be appreciated that the internal surface of the elbow 634 at the recessed portions 652 can have a shape corresponding to the surface 653. For example, the recessed portion 652 can include alternating outwardly curved concave sections 652a and inwardly projecting convex portions 652b. Accordingly, the internal surface of the recessed portion 652 can have a shape corresponding to and that engages the shape of the interior surface 670 of the tower support 660. The shape can be considered a petal shape or a flower shape, but can be provided as a regular polygon shape, an irregular polygon shape, a circle, or an oval.

The conical filter element 658 includes a conical media 674 and a seal member 676. The media 674 can be provided from any filtration media suitable for filtering air that can be arranged around the tower support 660. An exemplary filtration media that can be used as the media 674 can be characterized as a multilayer laminate media construction including a filtration media layer arranged in a waved configuration providing at least two waves per inch, wherein the filtration media has a first side and a second side, a first fibrous support layer adjacent the first side of the filtration media layer arranged in the waved configuration, and wherein the multilayer laminate media construction has a Frazier air permeability in a range of about 75 ft/min to about 200 ft/min when measured clean and non-oiled at 0.5 inch water column restriction according to ASTM D737. The exemplary filtration media is described in U.S. Provisional Application No. 61/856,467, filed on Jul. 19, 2013, wherein the entire disclosure of U.S. Provisional Application No. 61/856,467 is incorporated herein by reference. Alternative filtration media that can be used for the media 674 includes any type of woven or non-woven filtration media that can be formed into a conical construction to fit over the tower support 660. In general, the air flow through the secondary filter element 614 will keep the conical media pack 674 against the tower support 660.

The access cover 608 includes fasteners 631 that hold the access cover 608 onto the housing 606 in order to close the access opening 630. In addition, the access cover 608 includes a projection arrangement 672 that, when the access cover 608 is provided covering the access opening 630, supports the primary filter element 612 and engages the recess portion 652. In turn, the recessed portion 652 of the primary filter element 612 can engage the recessed portion 671c of the tower support 660. The recessed portion 671c includes the interior surface 670. The projection arrangement 672 can include a first projection portion 674 and a second projection portion 676. The first projection portion 674 includes a support surface 680 that supports the flat portion 650 on the receiver end 648. The second projection portion 676 includes a projection member 682 that is received within the recessed portion 652 of the receiver end 648. As shown in FIG. 20, the outside surface 684 can have a shape corresponding to the serpentine shape of the outer surface 653. The second projection portion 676 can also include a receiver 686 for receiving the projection 654. The second projection portion 676 can be referred to as a ring projection because of the presence of the receiver 686. The receiver 686 can be provided with a smooth surface 687, if desired.

Now referring to FIGS. 21a-21d, a primary filtration and air diverter 700 is shown that has features similar to the primary filtration and air diverter 600. One difference relates to the tower second end 766 where a projection 790 is provided to be received within the projection 754 in the receiver end 748 of the primary filter element 712. The tower second end 766 includes an exterior continuous surface 768 for allowing the secondary filter element 714 to seal thereto via the secondary element seal member 715. The tower second end 766 additionally includes an interior surface 770 configured to receive the recessed portion 752 of the receive end 748 of the primary filter element 712. The interior surface 770 and the corresponding interior surface 752 of the projection 754 can be provided having a serpentine shape as discussed in the context of FIGS. 19 and 20.

Figure 21A:
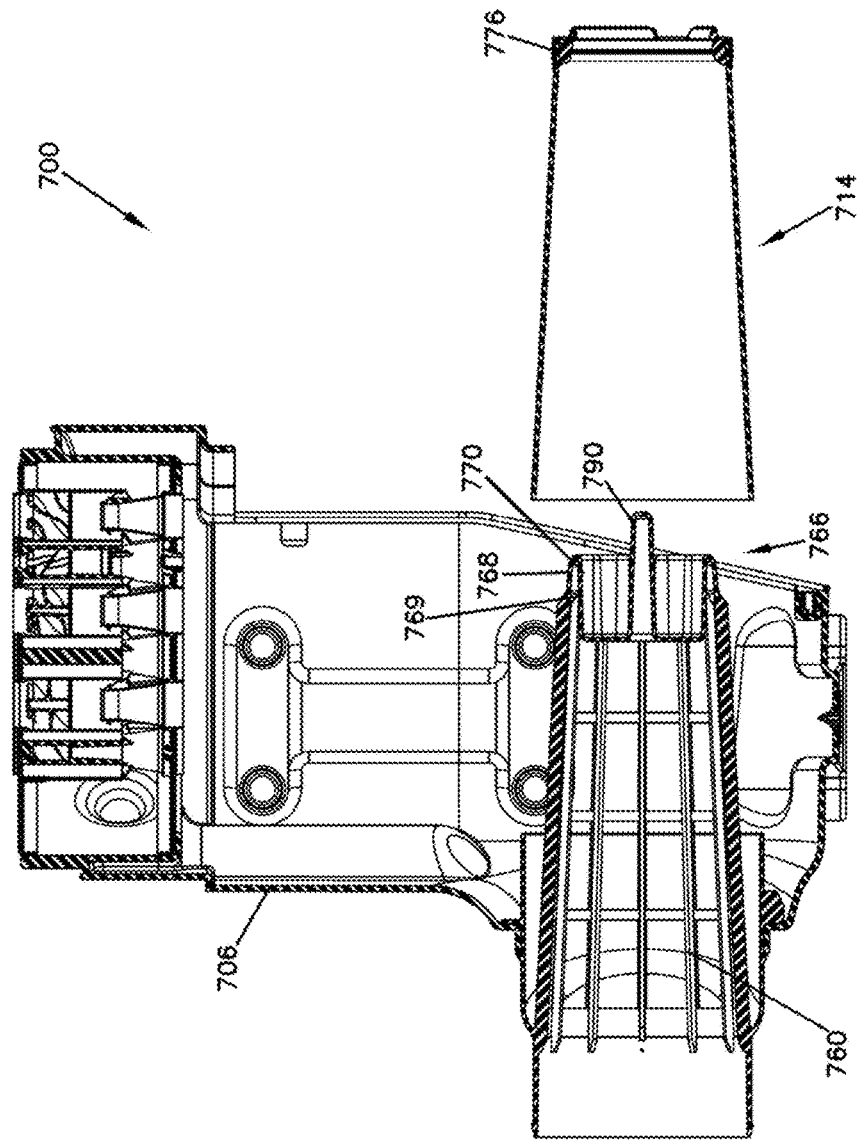
FIGS. 21a-21d are side, sectional views of an alternative embodiment of a primary filtration and air diverter according to the principles of the present disclosure and showing servicing thereof.
Figure 21B:
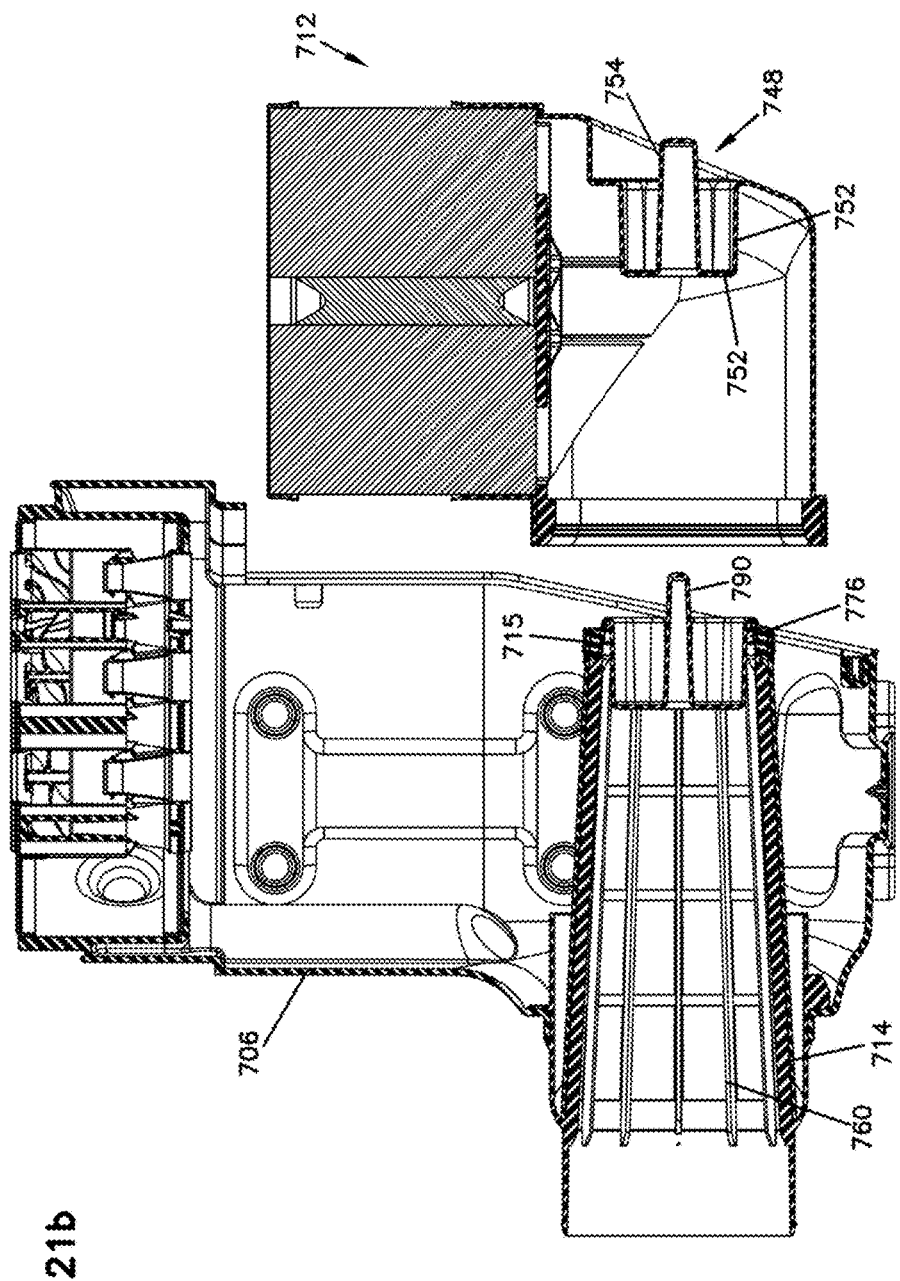
Figure 21C:
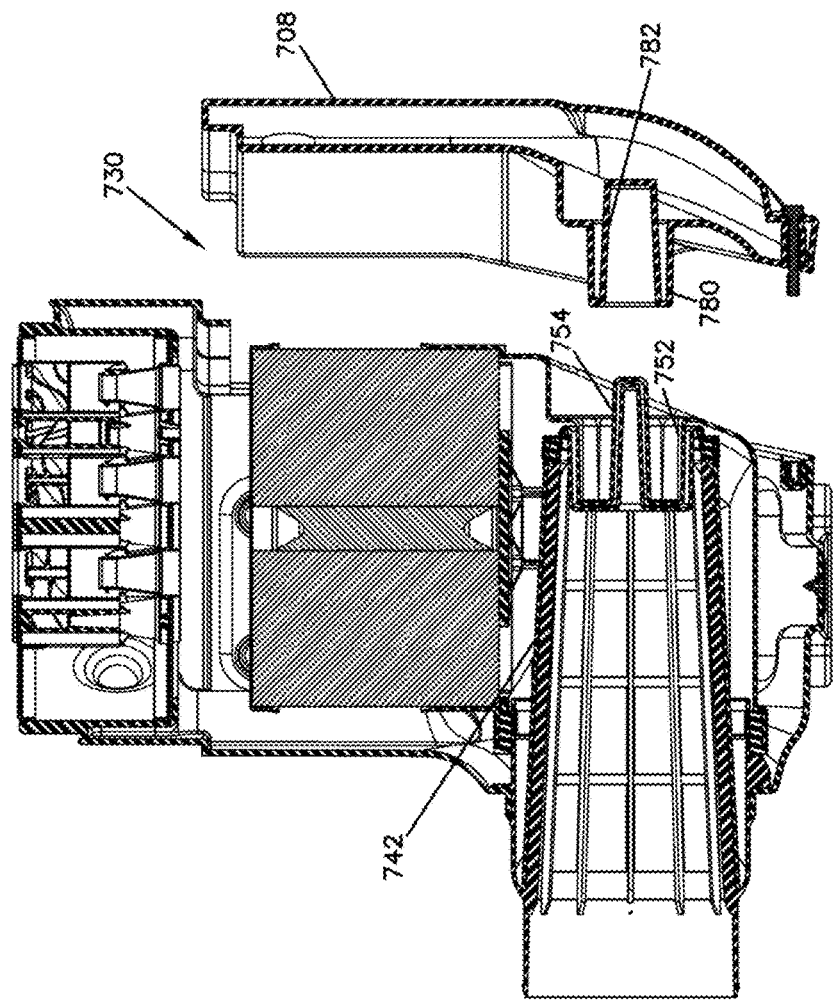
Figure 21D:
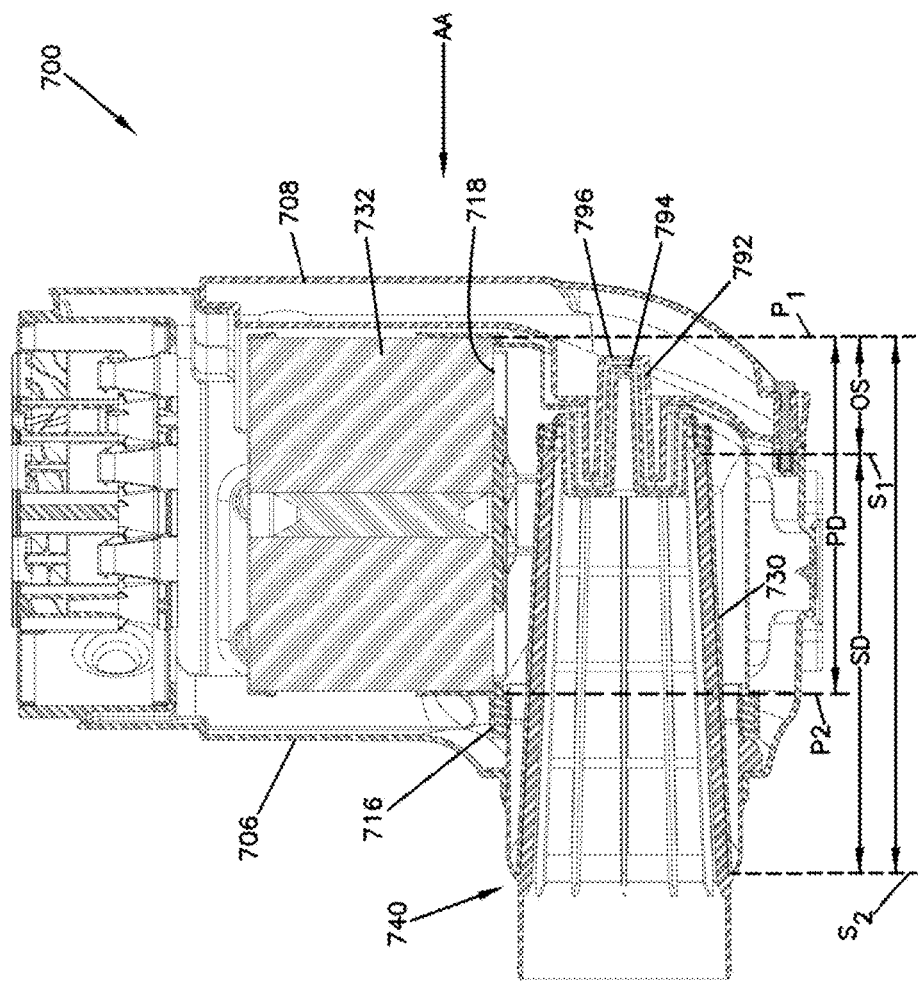

The projection 790 is shown extending beyond the interior surface 770 and is received within the projection 754 to help provide additional support to the tower second end 766. FIGS. 21a and 21b show the placement of the secondary filter element 714 on the tower support 760 so that the seal member 778 engages the tower exterior continuous surface 768. As shown in FIGS. 21b and 21c, the primary filter element 712 is then placed within the housing 706 so that the projection 790 is received within the projection 754 in the receiver end 748, and the recessed portion 752 of the receiver end 748 is received within the recessed region 769. As shown in FIGS. 21c and 21d, the access cover 708 is then placed over the housing access opening 730. The access cover 708 includes a projection 780 that engages the recessed portion 752, and includes a recessed portion 782 that engages the projection 754. In addition, the projection 780 can have a shape corresponding to the recessed portion 752, and the shape can be provided as a serpentine shape. In addition, the recessed portion 782 can have a shape corresponding to the projection 754, and that shape can be provided as a smooth cylindrical or conical shape. As shown in FIG. 21d, the tower closed end 792 nests within the primary filter element closed end 794, and the primary filter element closed end 794 nests within the access cover support 796. This arrangement helps maintain the stability of the main filter element 712 and the secondary filter element 714.

The primary filtration and air diverter 700 can be characterized as having a primary filter media pack and second filter media pack offset. This primary filter media pack and secondary filter media pack offset can be characterized by a secondary filter media pack not being present entirely within a projection of the perimeter of the primary filter media pack. In the case of FIGS. 4f, 5a, 9a, and 15a, the secondary filter media pack is exemplified as a pleated panel filter, and the secondary filter media pack is located outside the projection of the perimeter of the primary filter media pack. In other words, the secondary filter element media pack is not located directly beneath the primary filter element media pack when installed for use in a primary filtration and air diverter. Another example of this offset is exemplified in FIG. 21d. In FIG. 21d, the secondary filter element media pack 730 is not located entirely within a projection of the perimeter of the primary filter element media pack 732. The perimeter of the primary filter media pack can be depicted by lines $P_1$ and $P_2$. The distance depicted by lines $P_1$ and $P_2$ can be referred to as the primary filter element media pack distance PD. The perimeter of the secondary filter element media pack can be depicted by lines $S_1$ and $S_2$. The distance from $S_1$ and $S_2$ can be referred to as the secondary filter element media pack distance SD. As can be seen in FIG. 21d, the secondary filter element media pack distance (SD)

is offset from the primary filter element media pack distance (PD). This offset is indicated as the distance OS. The offset (OS) can be at least 40 mm, can be at least 45 mm, and can be at least 50 mm. The offset can be viewed as being in the second axial direction shown by arrow AA. It can be appreciated that while the offset can be shown in the context of the sectional side view of FIG. 21d, no offset would be seen when viewed from a front view the direction of the arrow AA. The reason for this is that the offset is in the direction of the arrow AA, and not in a direction 90 degrees to the arrow AA. In addition, the ratio of the secondary filter element media pack length SD to the offset OS can be characterized as at least 6. The presence of the offset OS is desirable to help cause the air to change direction without undo disturbances. The offset can provide for ramping or turning of air flow while minimizing air flow disturbance. In addition, it can be appreciated that the airflow disturbance is reduced by providing a larger clean air outlet 740 to accommodate the secondary filter element offset. This increase in cross sectional area can be explained as partly the result of shifting the conical or cylindrical secondary filter element toward the outlet 740.

The filter element according to the various described embodiments can provide a ratio of the filter element seal member cross sectional area to the filter arrangement cross sectional area that is sufficiently high to help air flow through the air cleaner. By providing a relatively large cross sectional area at the location of the filter element seal member relative to the filter arrangement cross sectional area, enhanced air flow properties are achieved. Preferably, the ratio of at least 0.5, and can be at least 0.6, and can be at least 0.7. In the context of FIG. 21d, the filter element seal member is indicated at reference number 716, and the cross sectional area refers to the flow area within the perimeter of the filter element seal member 716. The filter media pack includes a cross sectional area indicated at 718 where the air flows from the media pack into the elbow second end. This area is considered the filter arrangement cross sectional area.

Figure 22A:
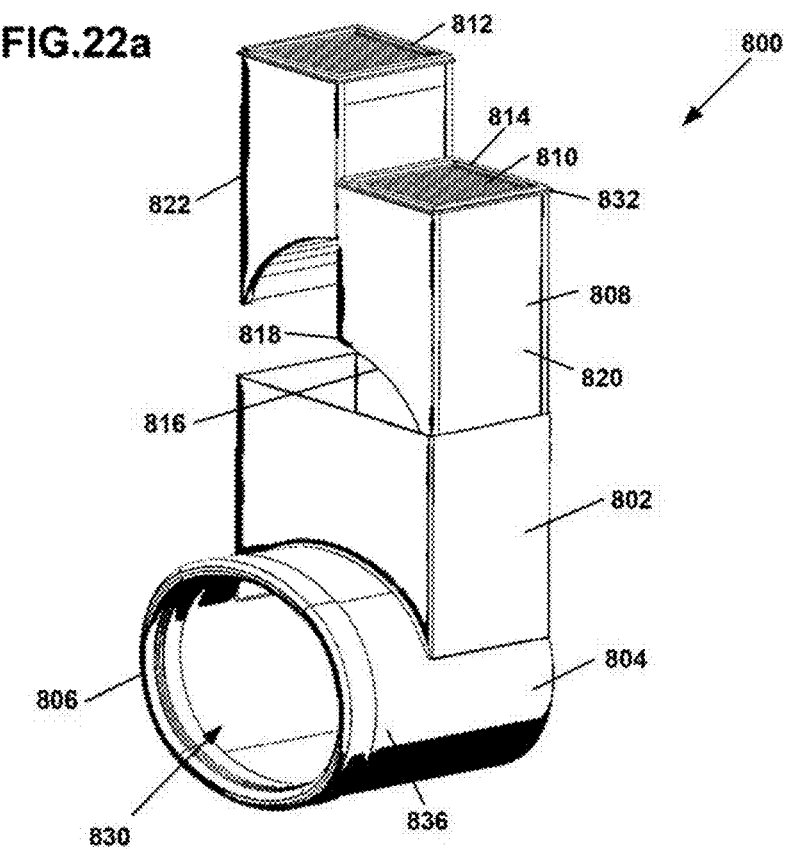
FIGS. 22a and 22b show an alternative filter element utilizing pleated media according to the principles of the present disclosure.
Figure 22B:
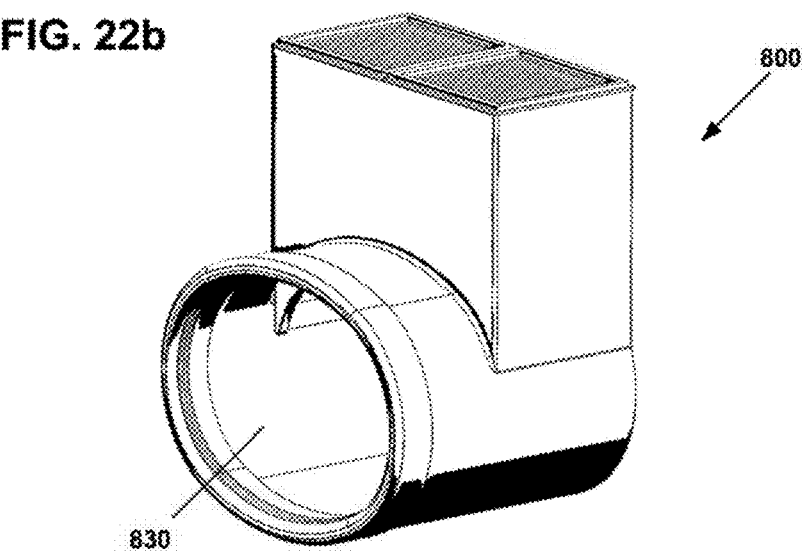

Now referring to FIGS. 22a and 22b, an alternative primary filter element or cartridge is shown at reference number 800. The primary filter element 800 includes a media pack receiver 802, an elbow 804 extending from the media pack receive 802 and provided for turning the air flow from a first direction to a second direction, a seal member 806 for creating a seal between the primary filter element 800 and a housing, and a pleated media pack 808 provided within the media pack receiver 802. The elbow 804 includes an interior region 830 wherein a safety or secondary filter element can be received.

The pleated media pack 808 is shown as a first media pack 810 and a second media pack 812. The first media pack 810 and the second media pack 812 are provided as pleated media containing a varying pleat height. In general, a varying pleat height means that the pleat height, which is the distance between the media pack inlet face 814 and the media pack outlet face 816, changes by at least 5 percent of the length across the media pack. Preferably, the pleat height changes by at least 10%. As shown, the first media pack 810 and the second media pack 812 are constructed to provide an increase in pleat height from a center 818 of the pleated media pack 808 toward the outsides 820 and 822 of the pleated media pack 808. As a result, the outlet face 816 creates a perimeter that fits around a safety element such as, for example, the safety element shown in FIG. 19. The outlet face 816 can be provided having a curvature or it can be provided as relatively straight or angles. If the outlet face 816 is provided as angled, it should be understood that the pleat height varies in a consistent linear arrangement. If the outlet face 816 is non-linear, then the pleat varies in a non-linear manner. For example, the outlet face 816 can form a curvature to more efficiently fit around the safety element that may be provided within the interior region 830. Furthermore, the first media pack 810 and the second media pack 812 each include a seal member 832 arranged there around for sealing to each other and to the media pack receiver 802. The first media pack 810 and the second media pack 812 can both fit within the media pack receiver, and it is desirable that dirty air not bypass the seal members 832 and, as a result, bypass the pleated media pack 808. The pleated media pack 808 can be removed from the media pack receiver 802 at any time for servicing.

Figure 22C:
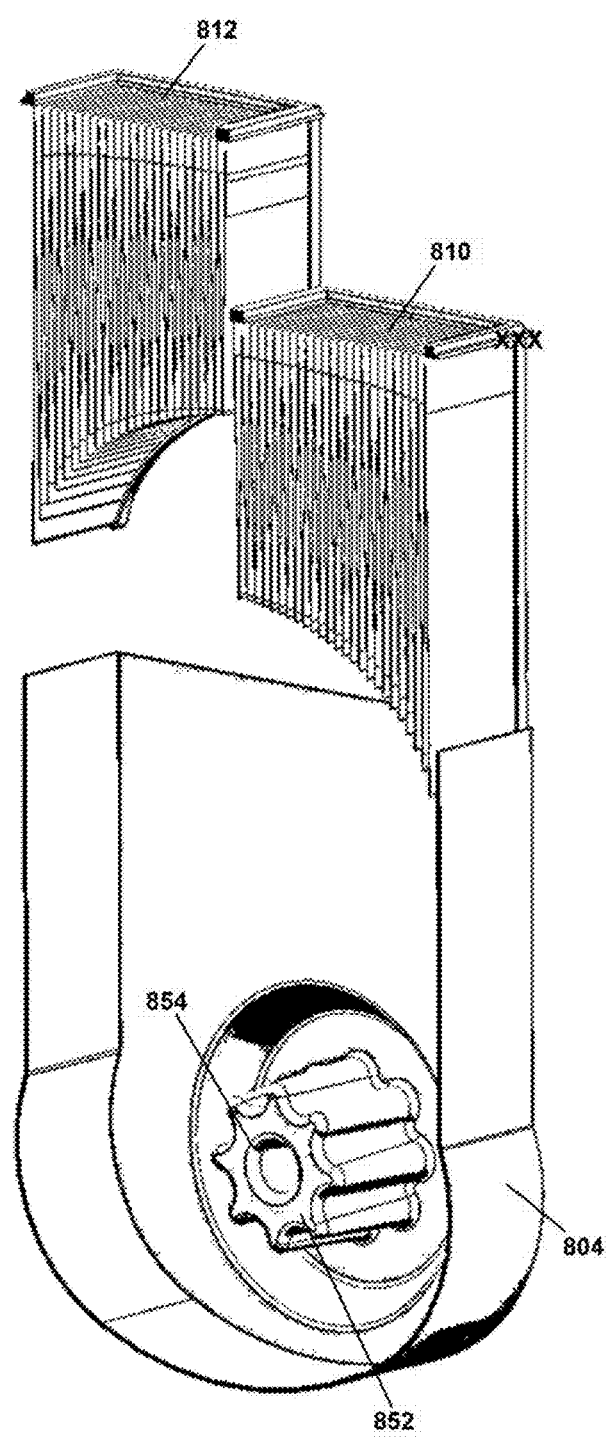

Now referring to FIG. 22c, a sectional view of the primary filter element 800 of FIG. 22a is depicted. Sectional views of the first media pack 810 and the second media pack 812 are provided. In addition, the primary filter element 800 includes an elbow 804 having a design consistent with the elbow 634 having a recessed portion 852 and a projection portion 854.

Figure 23A:
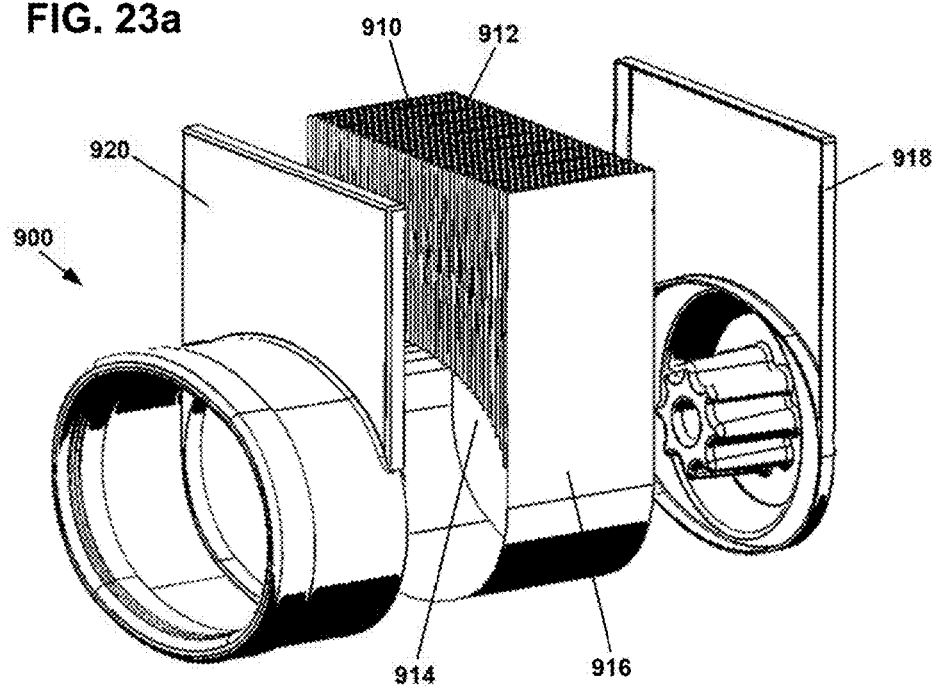
FIGS. 23a and 23b show an alternative filter element utilizing pleated media according to the principles of the present disclosure.
Figure 23B:
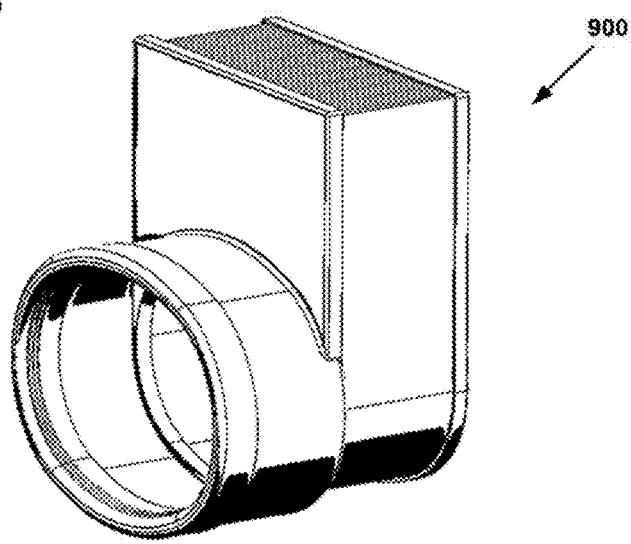

Now referring to FIGS. 23a and 23b an alternative primary filter element or cartridge is shown at reference number 900. The primary filter element 900 includes a pleated media pack 910 arranged in a panel configuration with a flat inlet 912 and a curved outlet 914. The curved outlet 914 is provided as a result of a varying pleat height. The pleated media pack 910 is enclosed within a media pack housing 916 that fits between an elbow first part 918 and an elbow second part 920 to thereby form the primary filter element 900.

Z-Filter Construction

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked on one another, to create a filter construction. An example of this is described in FIG. 11 of U.S. Pat. No. 5,820,646, incorporated herein by reference.

Herein, strips of material comprising fluted sheet secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet, is faced by the facing sheet, in each strip.

Typically, coiling of a strip of the fluted sheet/facing sheet combination (i.e., single facer) around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; and/or a media pack constructed or formed from such media into a three dimensional network of inlet and outlet flutes; and/or, a filter cartridge or construction including such a media pack.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet facing sheet or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising the stacking bead.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes and sealant for flute seals, large sealant surface areas (and volume) at both the upstream end and the downstream end are needed. High quality seals at these locations allow for proper operation of the media structure that results.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890 and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

Techniques for conducting a process for making a media strip (single facer) is described in PCT WO 04/007054, published Jan. 22, 2004 incorporated herein by reference.

Techniques for closing flutes by darting are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called race-track shapes, the opposite sides are generally straight. Race-track shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

It is noted that a blocked, stacked arrangement described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731,504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Summary Observations

In this summary, some selected, summary characterizations of teachings herein are provided. Among what is taught are:

1. A filter element comprising: (a) a filter arrangement comprising a filter media pack having a dirty air inlet and a clean air outlet, wherein: (i) air flowing through the clean air outlet flows in a first axial direction; and (ii) the clean air outlet defines a filter arrangement cross sectional area; (b) an elbow having a first end constructed to extend from the filter arrangement clean air outlet, a second end wherein air flowing through the second end flows in a second axial direction, and an air flow enclosure extending from the elbow first end to the elbow second end, the air flow enclosure comprising: (i) an air deflector constructed to direct air from the first axial direction to the second axial direction, wherein the second axial direction is different from the first axial direction; (ii) an interior volume between the elbow first end and the elbow second end; (c) a filter element seal member located on the elbow second end, wherein the filter element seal member is constructed to seal to a clean air intake, the filter element seal member located on the elbow second end defining a seal member cross sectional area; and (d) ratio of the seal member cross sectional area to the filter arrangement cross sectional area is at least 0.5.

2. A filter element according to characterization 1, wherein the filter media pack comprises a fluted media pack comprising inlet flutes and outlet flutes, wherein the media pack is closed to flow of unfiltered air into the inlet flutes and then outward from the outlet flutes without filtering.

3. A filter element according to characterization 2, wherein the filter media pack is arranged in a coiled construction.

4. A filter element according to characterization 1, wherein the filter media pack comprises a pleated media pack.

5. A filter element according to characterization 4, wherein the pleated media pack comprises a cylindrically arranged pleated media pack.

6. A filter element according to characterization 4, wherein the pleated media pack comprises a conically arranged pleated media pack.

7. A filter element according to characterization 4, wherein the pleated media pack is arranged in a panel construction.

8. A filter element according to any one of characterizations 1-7, wherein the ratio of the seal member cross sectional area to the filter arrangement cross sectional area is at least 0.6.

9. A filter element according to any one of characterizations 1-8, wherein the air flow enclosure comprises a first wall extending from the elbow first end and a second wall extending from the elbow second end, and wherein the air deflector has an air deflector first end extending at an angle from the first wall and an air deflector second end extending at an angle from the second wall.

10. A filter element according to characterization 9, wherein a plane extending from the air deflector first end to the air diverter second end extends at an angle of at least 10 degrees relative to the first axial direction.

11. A filter element according to any one of characterizations 1-10, wherein the air deflector comprises a ramp.

12. A filter element according to any one of characterizations 1-11, wherein the air deflector comprises a hollow extending from the air deflector into the interior volume.

13. A filter element according to any one of characterizations 1-12, wherein the filter media pack is adhered to the elbow first end.

14. A filter element according to any one of characterizations 1-12, wherein the filter arrangement comprises the filter media pack, a seal support arranged on the filter media pack, and a media pack seal member arranged on the seal support, and wherein the media pack seal member seals to the elbow first end.

15. A filter element according to any one of characterizations 1-14, wherein the filter element seal member is molded to the elbow second end.

16. A filter element according to any one of characterizations 1-14, wherein the filter element seal member comprises a gasket adhered to the elbow second end.

17. A filter element according to any one of characterizations 1-16, wherein the filter element seal member comprises an internally directed radial seal.

18. A filter element according to any one of characterizations 1-16, wherein the filter element seal member comprises an externally directed radial seal.

19. A filter element according to characterization 1-18, further comprising an anti-telescoping arrangement extending across the media pack clean air outlet.

20. A filter element according to any one of characterizations 1-19, wherein the first end of the elbow and the second end of the elbow are arranged at an angle of about 30 degrees to about 160 degrees to each other.

21. An air cleaner comprising: (a) an air cleaner housing comprising an air inlet, a primary filtration and air deflector region, an access opening, and an air outlet; (b) an access cover for closing the access opening of the air cleaner housing; and
   (c) a filter element according to any one of characterizations 1-20 and located within the air cleaner housing.

22. An air cleaner according to characterization 21, further comprising a precleaner located between the air inlet and the primary filtration and air deflector region.

23. An air cleaner according to any one of characterizations 21-22, wherein the access cover includes a surface that supports the air deflector.

24. An air cleaner according to any one of characterizations 21-23, further comprising a secondary filter element.

25. An air cleaner according to any one of characterizations 21-24, wherein the air deflector includes a projection surrounded by a recess, the access cover includes a recess that receives the air deflector projection, and the access cover includes a projection that is received within the air deflector recess.

26. An air cleaner according to characterization 25, wherein the secondary filter element includes a recess for receiving the air deflector recess.

27. An air cleaner according to any one of characterizations 25-26, wherein the secondary filter element includes a projection that projects into the air deflector projection.

28. A filter element comprising: (a) a filter arrangement comprising a z-filter media pack arranged in a coiled construction and having a dirty air inlet and an opposite clean air outlet, wherein: (i) air flowing through the dirty air inlet and the clean air outlet flows in a first axial direction; (ii) and clean air outlet defining a filter arrangement cross sectional area; and (b) an elbow having a first end constructed to extend from the filter arrangement clean air outlet, a second end wherein air flowing through the second end flows in a second axial direction, and an air flow enclosure extending from the elbow first end to the elbow second end, the air flow enclosure comprising: (i) an air deflector constructed to direct air from the first axial direction to the second axial direction, wherein the second axial direction is different from the first axial direction; (ii) an interior volume between the elbow first end and the elbow second end; (c) a filter element seal member located on the elbow second end, wherein the filter element seal member is constructed to seal to a clean air intake, the filter element seal member located on the elbow second end defining a seal member cross sectional area.

29. A filter element comprising: (a) a filter arrangement comprising a pleated media pack having a dirty air inlet and a clean air outlet, wherein: (i) air flowing through the clean air outlet flows in a first axial direction; (ii) the clean air outlet defining a filter arrangement; and (b) an elbow having a first end constructed to extend from the filter arrangement clean air outlet, a second end wherein air flowing through the second end flows in a second axial direction, and an air flow enclosure extending from the elbow first end to the elbow second end, the air flow enclosure comprising: (i) an air deflector constructed to direct air from the first axial direction to the second axial direction, wherein the second axial direction is different from the first axial direction; (ii) an interior volume between the elbow first end and the elbow second end; (c) a filter element seal member located on the second end of the elbow, wherein the filter element seal member is constructed to seal to a clean air intake, the filter element seal member located on the elbow second end defining a seal member cross sectional area.

30. A filter element according to characterization 29, wherein the pleated media pack comprises a cylindrically arranged pleated media pack.

31. A filter element according to characterization 29, wherein the pleated media pack comprises a conically arranged pleated media pack.

32. A filter element according to characterization 29, wherein the pleated media pack is arranged in a panel construction.

33. A filter element according to any one of characterizations 28-32, wherein the ratio of the seal member cross sectional area to the filter arrangement cross sectional area is at least 0.6.

34. A filter element according to any one of characterizations 28-33, wherein the air flow enclosure comprises a first wall extending from the elbow first end and a second wall extending from the elbow second end, and wherein the air deflector has an air deflector first end extending at an angle from the first wall and an air deflector second end extending at an angle from the second wall.

35. A filter element according to characterization 34, wherein a plane extending from the air deflector first end to the air deflector second end extends at an angle of at least 10 degrees relative to the first axial direction.

36. A filter element according to any one of characterizations 28-35, wherein the air deflector comprises a ramp.

37. A filter element according to any one of characterizations 28-35, wherein the air deflector comprises a hollow extending from the air deflector into the interior volume.

38. A filter element according to any one of characterizations 28-37, wherein the filter media pack is adhered to the elbow first end.

39. A filter element according to any one of characterizations 28-38, wherein the filter arrangement comprises the filter media pack, a seal support arranged on the filter media pack, and a media pack seal member arranged on the seal support, and wherein the media pack seal member seals to the elbow first end.

40. A filter element according to any one of characterizations 28-39, wherein the filter element seal member is molded to the elbow second end.

41. A filter element according to any one of characterizations 28-39, wherein the filter element seal member comprises a gasket adhered to the elbow second end.

42. A filter element according to any one of characterizations 28-41, wherein the filter element seal member comprises an internally directed radial seal.

43. A filter element according to any one of characterizations 28-42, wherein the filter element seal member comprises an externally directed radial seal.

44. A filter element according to any one of characterizations 28-43, further comprising an anti-telescoping arrangement extending across the media pack clean air outlet.

45. A filter element according to any one of characterizations 28-44, wherein the first end of the elbow and the second end of the elbow are arranged at an angle of about 30 degrees to about 160 degrees to each other.

46. An air cleaner comprising: (a) an air cleaner housing comprising an air inlet, a primary filtration and air deflector region, an access opening, and an air outlet; (b) an access cover for closing the access opening of the air cleaner housing; and
   (c) a filter element according to any one of characterizations 28-45 and located within the air cleaner housing.

47. An air cleaner according to characterization 46, further comprising a precleaner located between the air inlet and the primary filtration and air deflector region.

48. An air cleaner according to any one of characterizations 46-47, wherein the access cover includes a surface that supports the air deflector.

49. An air cleaner according to any one of characterizations 46-48, further comprising a secondary filter element.

50. An air cleaner according to any one of characterizations 46-49, wherein the air deflector includes a projection surrounded by a recess, the access cover includes a recess that receives the air deflector projection, and the access cover includes a projection that is received within the air deflector recess.

51. An air cleaner according to characterization 50, wherein the secondary filter element includes a recess for receiving the air deflector recess.

52. An air cleaner according to any one of characterizations 50-51, wherein the secondary filter element includes a projection that projects into the air deflector projection.

53. A filter element comprising: (a) a filter arrangement comprising a filter media pack having a dirty air inlet and a clean air outlet, wherein air flowing through the clean air outlet flows in a first axial direction; (b) an elbow having a first end constructed to extend from the filter arrangement clean air outlet, a second end wherein air flowing through the second end flows in a second axial direction, and an air flow enclosure extending from the elbow first end to the elbow second end, the air flow enclosure comprising: (i) an interior volume between the elbow first end and the elbow second end; (ii) a first wall extending from the elbow first end, and a second wall extending from the elbow second end; (iii) an air deflector constructed to direct air from the first axial direction to the second axial direction, wherein the second axial direction is different from the first axial direction; (iv) the air deflector has an air deflector first end extending at an angle from the first wall, and an air deflector second end extending at an angle from the second wall so that a plane extending from the air deflector first end to the air deflector second end extends at an angle of at least 10 degrees relative to the first axial direction; and (c) a filter element seal member provided on the second end of the elbow, wherein the seal member is constructed to seal to a clean air intake.

54. A filter element according to characterization 53, wherein the filter media pack comprises a fluted media pack comprising inlet flutes and outlet flutes, wherein the media pack is closed to flow of unfiltered air into the inlet flutes and then outward from the outlet flutes without filtering.

55. A filter element according to characterization 54, wherein the filter media pack is arranged in a coiled construction.

56. A filter element according to characterization 53, wherein the filter media pack comprises a pleated media pack.

57. A filter element according to characterization 56, wherein the pleated media pack comprises a cylindrically arranged pleated media pack.

58. A filter element according to characterization 56, wherein the pleated media pack comprises a conically arranged pleated media pack.

59. A filter element according to characterization 56, wherein the pleated media pack is arranged in a panel construction.

60. A filter element according to any one of characterizations 53-59, wherein the ratio of the seal member cross sectional area to the filter arrangement cross sectional area is at least 0.6.

61. A filter element according to any one of characterizations 53-60, wherein the air deflector comprises a ramp.

62. A filter element according to any one of characterizations 53-61, wherein the air deflector has a length from the air deflector first end to the air deflector second end that is ⅓ of the farthest distance from the first wall to the filter element seal member.

63. A filter element according to any one of characterizations 53-62, wherein the air deflector comprises a hollow extending from the air deflector into the interior volume.

64. A filter element according to any one of characterizations 53-63, wherein the filter media pack is adhered to the elbow first end.

65. A filter element according to any one of characterizations 53-63, wherein the filter arrangement comprises the filter media pack, a seal support arranged on the filter media pack, and a media pack seal member arranged on the seal support, and wherein the media pack seal member seals to the elbow first end.

66. A filter element according to any one of characterizations 53-65, wherein the filter element seal member is molded to the elbow second end.

67. A filter element according to any one of characterizations 53-65, wherein the filter element seal member comprises a gasket adhered to the elbow second end.

68. A filter element according to any one of characterizations 53-67, wherein the filter element seal member comprises an internally directed radial seal.

69. A filter element according to any one of characterizations 53-68, wherein the filter element seal member comprises an externally directed radial seal.

70. A filter element according to any one of characterizations 53-69, further comprising an anti-telescoping arrangement extending across the media pack clean air outlet.

71. A filter element according to any one of characterizations 53-70, wherein the first end of the elbow and the second end of the elbow are arranged at an angle of about 30 degrees to about 160 degrees to each other.

72. An air cleaner comprising: (a) an air cleaner housing comprising an air inlet, a primary filtration and air deflector region, an access opening, and an air outlet; (b) an access cover for closing the access opening of the air cleaner housing; and (c) a filter element according to any one of characterizations 53-71 and located within the air cleaner housing.

73. An air cleaner according to characterization 72, further comprising a precleaner located between the air inlet and the primary filtration and air deflector region.

74. An air cleaner according to any one of characterizations 72-73, wherein the access cover includes a surface that supports the air deflector.

75. An air cleaner according to any one of characterizations 72-74, further comprising a secondary filter element.

76. An air cleaner according to any one of characterizations 72-75, wherein the air deflector includes a projection surrounded by a recess, the access cover includes a recess that receives the air deflector projection, and the access cover includes a projection that is received within the air deflector recess.

77. An air cleaner according to characterization 76, wherein the secondary filter element includes a recess for receiving the air deflector recess.

78. An air cleaner according to any one of characterizations 76-77, wherein the secondary filter element includes a projection that projects into the air deflector projection.

79. An air cleaner system constructed for use on a motor vehicle having an engine compartment enclosed by an engine hood and a clean air intake, the air cleaner system being constructed to extend at least partly outside the engine compartment enclosed by the hood and provide clean air to the engine compartment enclosed by the engine hood, and comprising: (a) a vertically extending snorkel comprising an air inlet and an air outlet; (b) an air cleaner housing constructed to receive air from the snorkel air outlet, the air cleaner comprising: (i) a primary filtration and air deflector region; and (ii) an access opening for accessing the primary filtration and air deflector region; (c) an access cover for closing the access opening of the air cleaner housing; (d) a filter element located within the air cleaner housing, the filter element comprising: (i) a filter media pack construction having a clean air outlet wherein air flowing through the clean air outlet flows in a first axial direction; and (ii) an elbow having a first end constructed to extend from the filter media pack clean air outlet of the filter media pack construction, a second end wherein air flowing through the second end flows in a second axial direction, and an air flow enclosure extending from the elbow first end to the elbow second end, the air flow enclosure comprising: (A) an interior volume between the elbow first end and the elbow second end; (B) an air deflector constructed to direct air from the first axial direction to the second axial direction, wherein the second axial direction is different from the first axial direction; (iii) a seal member located at the second end of the elbow, wherein the seal member is sealed to the air cleaner housing; and (e) the air cleaner housing having a clean air outlet constructed to provide clean air to the engine compartment enclosed by the hood.

80. An air intake system according to characterization 79, further comprising a precleaner located upstream of the primary filtration and air deflector region.

81. An air intake system according to any of characterizations 79-80, further comprising a secondary filter element located downstream of the primary filtration and air deflector region.

82. An air intake system according to any of characterization 81, wherein the safety comprises a pleated panel filter located at the elbow second end.

83. An air intake system according to characterization 81, wherein the secondary filter element comprises depth media supported by a tower construction extending from the air cleaner housing air outlet and toward the air deflector.

84. An air cleaner according to any one of characterizations 79-83, wherein the air deflector includes a projection surrounded by a recess, the access cover includes a recess that receives the air deflector projection, and the access cover includes a projection that is received within the air deflector recess.

85. An air cleaner according to characterization 84, wherein the secondary filter element includes a recess for receiving the air deflector recess.

86. An air cleaner according to any one of characterizations 84-85, wherein the secondary filter element includes a projection that projects into the air deflector projection.

87. An air intake system according to any one of characterizations 84-86, wherein the air deflector recess includes a first recess forming a flat surface and a second recess extending away from the flat surface and toward the second end of the elbow.

88. An air intake system according to characterization 87, wherein the second recess comprises a wall forming a flower pattern configuration.

89. An air intake system according to any one of characterizations 83-88, wherein secondary filter element located within the air cleaner housing comprises a secondary filter element media pack, the filter media pack construction comprises a primary filtration media pack, and the secondary filter element media pack and the primary filter media pack are offset by at least 40 mm in the second axial direction.

90. An air cleaner system comprising: (a) an air cleaner housing comprising an air inlet, a primary filtration and air deflector region, an access opening, an access cover, and an air outlet; (b) an access cover for closing the access opening of the air cleaner housing; and (c) a primary filter element located within the air cleaner housing, the primary filter element comprising: (i) a filter arrangement comprising a primary media pack having a clean air outlet wherein air flowing through the clean air outlet flows in a first axial direction; and (ii) an elbow having a first end constructed to extend from the clean air outlet of the filter media pack construction, a second end wherein air flowing through the second end flows in a second axial direction, and an air flow enclosure extending from the elbow first end to the elbow second end, the air flow enclosure comprising: an air deflector constructed to direct air from the first axial direction to the second axial direction, wherein the second axial direction is different from the first axial direction; an interior volume between the elbow first end and the elbow second end; (iii) a filter element seal member attached to the second end of the elbow, wherein the seal member is sealed to the air cleaner housing; and (d) a secondary filter element located within the air cleaner housing and comprising a secondary media pack, and wherein the secondary filter media pack and the primary media pack are offset by at least 40 mm in the second axial direction.

91. An air cleaner system according to characterization 90, wherein the primary media pack comprises a z-filter media pack.

92. An air cleaner system according to characterization 90, wherein the primary media pack comprises a cylindrically arranged pleated media pack.

93. An air cleaner system according to characterization 90, wherein the primary media pack comprises a conically arranged pleated media pack.

94. An air cleaner system according to characterization 90, wherein the primary media pack is arranged in a panel construction.

95. An air cleaner system according to any one of characterizations 90-94, wherein the seal member defines a seal member cross sectional area and the filter arrangement defines a filter arrangement cross sectional area, and the ratio of the seal member cross sectional area to the filter arrangement cross sectional area is at least 0.6.

96. An air cleaner system according to any one of characterizations 90-95, wherein the air flow enclosure comprises a first wall extending from the elbow first end and a second wall extending from the elbow second end, and wherein the air deflector has an air deflector first end extending at an angle from the first wall and an air deflector second end extending at an angle from the second wall.

97. An air cleaner system according to characterization 96, wherein a plane extending from the air deflector first end to the air deflector second end extends at an angle of at least 10 degrees relative to the first axial direction.

98. An air cleaner system according to any one of characterizations 90-97, wherein the air deflector comprises a ramp.

99. An air cleaner system according to any one of characterizations 90-98, wherein the air deflector comprises a hollow extending from the air deflector into the interior volume.

100. An air cleaner system according to any one of characterizations 90-99, wherein the filter media pack is adhered to the elbow first end.

101. An air cleaner system according to any one of characterizations 90-99, wherein the filter arrangement comprises the filter media pack, a seal support arranged on the filter media pack, and a media pack seal member arranged on the seal support, and wherein the media pack seal member seals to the elbow first end.

102. An air cleaner system according to any one of characterizations 90-101, wherein the filter element seal member is molded to the elbow second end.

103. An air cleaner system according to any one of characterizations 90-101, wherein the filter element seal member comprises a gasket adhered to the elbow second end.

104. An air cleaner system according to any one of characterizations 90-103, wherein the filter element seal member comprises an internally directed radial seal.

105. An air cleaner system according to any one of characterizations 90-103, wherein the filter element seal member comprises an externally directed radial seal.

106. An air cleaner system according to any one of characterizations 90-105, further comprising an anti-telescoping arrangement extending across the media pack clean air outlet.

107. An air cleaner system according to any one of characterizations 90-106, wherein the first end of the elbow and the second end of the elbow are arranged at an angle of about 30 degrees to about 160 degrees to each other.

108. An air cleaner system according to any one of characterizations 90-107, wherein the air deflector includes a projection surrounded by a recess, the access cover includes a recess that receives the air deflector projection, and the access cover includes a projection that is received within the air deflector recess.

109. An air cleaner system according to characterization 108, wherein the secondary filter element includes a recess for receiving the air deflector recess.

110. An air cleaner system according to any one of characterizations 108-109, wherein the secondary filter element includes a projection that projects into the air deflector projection.

The above specification provides a complete description of the manufacture and use of the invention. Since many embodiments of the invention can be made without departing from the spirit and scope of the invention, the invention resides in the claims hereinafter appended.

What is claimed is:

1. A filter element comprising:
   (a) a filter arrangement comprising a filter media pack having a dirty air inlet and a clean air outlet, wherein:
      (i) air flowing through the clean air outlet flows in a first axial direction; and
      (ii) the clean air outlet defines a filter arrangement cross sectional area;
   (b) an elbow having a first end constructed to extend from the filter arrangement clean air outlet, a second end wherein air flowing through the second end flows in a second axial direction, and an air flow enclosure extending from the elbow first end to the elbow second end, the air flow enclosure comprising:
      (i) an air deflector constructed to direct air from the first axial direction to the second axial direction, wherein the second axial direction is different from the first axial direction;
      (ii) an interior volume between the elbow first end and the elbow second end; and
      (iii) wherein the air deflector comprises a hollow extending from the air deflector into the interior volume;
   (c) a filter element seal member located on the elbow second end, wherein the filter element seal member is constructed to seal to a clean air intake, the filter element seal member located on the elbow second end defining a seal member cross sectional area.

2. A filter element according to claim 1, wherein the filter media pack comprises a fluted media pack comprising inlet flutes and outlet flutes, wherein the media pack is closed to flow of unfiltered air into the inlet flutes and then outward from the outlet flutes without filtering.

3. A filter element according to claim 2, wherein the filter media pack is arranged in a coiled construction.

4. A filter element according to claim 1, wherein the filter media pack comprises a pleated media pack.

5. A filter element according to claim 4, wherein the pleated media pack comprises a cylindrically arranged pleated media pack.

6. A filter element according to claim 4, wherein the pleated media pack comprises a conically arranged pleated media pack.

7. A filter element according to claim 4, wherein the pleated media pack is arranged in a panel construction.

8. A filter element according to claim 1, wherein the ratio of the seal member cross sectional area to the filter arrangement cross sectional area is at least 0.6.

9. A filter element according to claim 1, wherein the air flow enclosure comprises a first wall extending from the elbow first end and a second wall extending from the elbow second end, and wherein the air deflector has an air deflector first end extending at an angle from the first wall and an air deflector second end extending at an angle from the second wall.

10. A filter element according to claim 9, wherein a plane extending from the air deflector first end to the air deflector second end extends at an angle of at least 10 degrees relative to the first axial direction.

11. A filter element according to claim 1, wherein the air deflector comprises a ramp.

12. A filter element according to claim 1, wherein the filter media pack is adhered to the elbow first end.

13. A filter element according to claim 1, wherein the filter arrangement comprises the filter media pack, a seal support arranged on the filter media pack, and a media pack seal member arranged on the seal support, and wherein the media pack seal member seals to the elbow first end.

14. A filter element according to claim 1, wherein the filter element seal member is molded to the elbow second end.

15. A filter element according to claim 1, wherein the filter element seal member comprises a gasket adhered to the elbow second end.

16. A filter element according to claim 1, wherein the filter element seal member comprises an internally directed radial seal.

17. A filter element according to claim 1, wherein the filter element seal member comprises an externally directed radial seal.

18. A filter element according to claim 1; further comprising an anti-telescoping arrangement extending across the media pack clean air outlet.

19. A filter element according to claim 1, wherein the first end of the elbow and the second end of the elbow are arranged at an angle of about 30 degrees to about 160 degrees to each other.

20. An air cleaner comprising:
(a) an air cleaner housing comprising an air inlet, a primary filtration and air deflector region, an access opening, and an air outlet;
(b) an access cover for closing the access opening of the air cleaner housing; and
(c) a filter element according to claim 1, and located within the air cleaner housing.

21. An air cleaner according to claim 20, further comprising a precleaner located between the air inlet and the primary filtration and air deflector region.

22. An air cleaner according to claim 20, wherein the access cover includes a surface that supports the air deflector.

23. An air cleaner according to claim 20, further comprising a secondary filter element.

24. An air cleaner according to claim 20, wherein the air deflector includes a projection surrounded by a recess, the access cover includes a recess that receives the air deflector projection, and the access cover includes a projection that is received within the air deflector recess.

25. An air cleaner according to claim 24, further comprising a secondary filter element, wherein the secondary filter element includes a recess for receiving the air deflector recess.

26. An air cleaner according to claim 20, wherein the secondary filter element includes a projection that projects into the air deflector projection.

27. A filter element according to claim 1, wherein a ratio of the seal member cross sectional area to the filter arrangement cross sectional area is at least 0.5.

* * * * *